(12) United States Patent
Baker et al.

(10) Patent No.: US 6,648,944 B1
(45) Date of Patent: Nov. 18, 2003

(54) CARBON DIOXIDE REMOVAL PROCESS

(75) Inventors: Richard W. Baker, Palo Alto, CA (US); Andre R. Da Costa, Menlo Park, CA (US); Kaaeid A. Lokhandwala, Fremont, CA (US)

(73) Assignee: Membrane Technology and Research, Inc., Menlo Park, CA (US)

( * ) Notice: Subject to any disclaimer, the term of this patent is extended or adjusted under 35 U.S.C. 154(b) by 0 days.

(21) Appl. No.: 10/354,208

(22) Filed: Jan. 28, 2003

(51) Int. Cl.$^7$ .................................. B01D 53/22
(52) U.S. Cl. ..................... 95/39; 95/50; 95/51; 96/9
(58) Field of Search ........................ 95/39, 45, 50, 95/51; 96/4, 8, 9, 10, 13, 14

(56) References Cited

U.S. PATENT DOCUMENTS

| | | | |
|---|---|---|---|
| 4,130,403 A | * 12/1978 | Cooley et al. ............... 95/49 |
| 4,685,940 A | 8/1987 | Soffer et al. ............... 55/158 |
| 4,857,078 A | 8/1989 | Watler ...................... 55/16 |
| 4,880,442 A | 11/1989 | Hayes ....................... 55/16 |
| 4,881,953 A | * 11/1989 | Prasad et al. ................ 95/41 |
| 5,089,033 A | 2/1992 | Wijmans ..................... 95/39 |
| 5,141,642 A | 8/1992 | Kusuki et al. .............. 210/490 |
| 5,199,962 A | 4/1993 | Wijmans ..................... 95/39 |
| 5,205,843 A | 4/1993 | Kaschemekat et al. ........ 55/16 |
| 5,273,572 A | * 12/1993 | Baker et al. ................. 95/48 |
| 5,281,253 A | * 1/1994 | Thompson .................... 95/22 |
| 5,281,255 A | 1/1994 | Toy et al. ................... 95/50 |
| 5,332,424 A | 7/1994 | Rao et al. ................... 95/47 |
| 5,374,300 A | 12/1994 | Kaschemekat et al. ......... 95/39 |
| 5,378,263 A | * 1/1995 | Prasad ....................... 95/54 |
| 5,407,466 A | 4/1995 | Lokhandwala et al. ......... 95/49 |
| 5,501,722 A | 3/1996 | Toy et al. ................... 95/50 |
| 5,772,734 A | * 6/1998 | Baker et al. ................. 95/42 |
| 5,779,763 A | * 7/1998 | Pinnau et al. ................ 95/39 |
| 5,980,609 A | * 11/1999 | Baker et al. ................. 95/39 |
| 6,161,386 A | * 12/2000 | Lokhandwala ............... 60/649 |
| 6,168,649 B1 | * 1/2001 | Jensvold et al. .............. 95/47 |
| 6,361,582 B1 | 3/2002 | Pinnau et al. ................ 95/45 |
| 6,361,583 B1 | 3/2002 | Pinnau et al. ................ 95/45 |
| 6,428,606 B1 | * 8/2002 | Gottschlich et al. ........... 95/50 |
| 6,565,626 B1 | * 5/2003 | Baker et al. ................. 95/47 |
| 6,572,678 B1 | * 6/2003 | Wijmans et al. .............. 95/47 |
| 2002/0124722 A1 | * 9/2002 | Baker et al. ................. 95/45 |
| 2002/0152889 A1 | * 10/2002 | Baker et al. ................. 95/45 |
| 2003/0047068 A1 | * 3/2003 | Brazier ...................... 95/45 |

FOREIGN PATENT DOCUMENTS

JP     64-43329     2/1989

* cited by examiner

Primary Examiner—Robert H. Spitzer
(74) Attorney, Agent, or Firm—J. Farrant

(57) ABSTRACT

A process and apparatus for separating carbon dioxide from gas, especially natural gas, that also contains $C_{3+}$ hydrocarbons. The invention uses two or three membrane separation steps, optionally in conjunction with cooling/condensation under pressure, to yield a lighter, sweeter product natural gas stream, and/or a carbon dioxide stream of reinjection quality and/or a natural gas liquids (NGL) stream.

84 Claims, 2 Drawing Sheets

CARBON DIOXIDE REMOVAL PROCESS

This invention was made in part with Government support under award number DE-FG03-97ER82429, awarded by the Department of Energy. The Government has certain rights in this invention.

FIELD OF THE INVENTION

The invention relates to the treatment of natural gas and other gas streams containing carbon dioxide and methane. More particularly, the invention relates to the use of gas separation membranes to remove excess carbon dioxide from the gas.

BACKGROUND OF THE INVENTION

Natural gas is the most important fuel gas in the United States and provides more than one-fifth of all the primary energy used in the United States. Natural gas is also used extensively as a basic raw material in the petrochemical and other chemical process industries. The composition of natural gas varies widely from field to field. For example, a raw gas stream may contain as much as 95% methane, with only minor amounts of other hydrocarbons, nitrogen, carbon dioxide, hydrogen sulfide or water vapor. On the other hand, streams with large proportions of one or more of these contaminants are common. For example, gas that is extracted as a result of miscible flood enhanced oil recovery may be very rich in carbon dioxide, as well as being saturated with $C_{3+}$ hydrocarbons.

Overall, about 10% of gas exceeds the typical gas pipeline specification for carbon dioxide of no more than 2%.

Before such gas can be sent to the supply pipeline, the carbon dioxide content must be reduced. Various techniques for acid gas removal, including absorption into an amine solution, cryogenic separation and membrane separation, have been used in the industry. Each has its own advantages and disadvantages.

If membrane separation is used, cellulose acetate membranes, which can provide a carbon dioxide/methane selectivity of about 10–20 in gas mixtures at pressure, have been the membranes of choice, and about 100 plants using cellulose acetate membranes are believed to have been installed around the world.

It would be desirable in many more cases to use membrane separation, because membrane systems are relatively simple, have few moving parts, can operate under moderate temperature and pressure conditions and, unlike amine scrubbing, do not require a regeneration cycle. Also, the wellhead gas pressure may be high enough to provide the total driving force for transmembrane permeation. However, cellulose acetate and other polymeric membranes are not without problems.

Natural gas often contains substantial amounts of water, either as entrained liquid, or in vapor form, which may lead to condensation within the membrane modules. The gas separation properties of cellulose acetate membranes are destroyed by contact with liquid water. Therefore, care must be taken to remove all entrained liquid water upstream of the membrane separation steps and to lower the water vapor dew point comfortably below the lowest temperature that the gas under treatment is likely to encounter.

Likewise, many membranes are irreparably damaged by liquid hydrocarbons, and similar precautions must be taken to avoid the risk of condensation of $C_{3+}$ hydrocarbons on the membranes at any time. The presence of more than modest ppm levels of hydrogen sulfide, especially in conjunction with water and heavy hydrocarbons, is also potentially damaging.

Furthermore, carbon dioxide readily sorbs into and interacts strongly with many polymers, and in the case of gas mixtures such as carbon dioxide/methane with other components, the carbon dioxide tends to have a swelling or plasticizing effect, thereby adversely changing the membrane permeation characteristics. Although some membrane materials, such as polyimides, exhibit a high ideal selectivity for carbon dioxide over methane when measured with pure gases at modest pressures in the laboratory, the selectivity obtained under mixed gas, high-pressure conditions is much lower. This means it is often very difficult under field conditions to meet target specifications for carbon dioxide content without resorting to impractically large amounts of membrane area and/or unacceptably complicated processing schemes.

These issues are discussed in more detail in U.S. Pat. No. 5,407,466, columns 2–6, which patent is incorporated herein by reference.

Thus, although membranes have been, and are, used to remove carbon dioxide from natural gas, there are many situations where the composition of the gas, the size of the stream to be processed, or the site geography render a membrane-based process technically or economically unrealistic.

That membranes can separate $C_{3+}$ hydrocarbons from gas mixtures, such as natural gas, is known, for example from U.S. Pat. Nos. 4,857,078, 5,281,255 and 5,501,722. It has also been recognized that condensation and membrane separation maybe combined, as is shown, for example, in U.S. Pat. Nos. 5,089,033; 5,199,962; 5,205,843 and 5,374,300.

In spite of the above knowledge and practices, technology that can process gas containing excess quantities of carbon dioxide, $C_{3+}$ hydrocarbons and water in a cost-effective manner is still needed. The challenge of treating gas that contains relatively large amounts of carbon dioxide, such as more than about 8% or 10%, for example, is particularly difficult.

SUMMARY OF THE INVENTION

The invention is a process and apparatus for separating carbon dioxide from gas, especially natural gas, that also contains $C_{3+}$ hydrocarbons. The invention uses two or three membrane separation steps, optionally in conjunction with cooling/condensation/phase separation under pressure, to yield a lighter, sweeter product natural gas stream, and/or a carbon dioxide stream of reinjection quality and/or a natural gas liquids (NGL) stream.

In a basic embodiment, the process of the invention includes the following steps for treating a gas stream:

(a) providing a first membrane having a first feed side and a first permeate side and being selective for $C_{3+}$ hydrocarbons over methane;

(b) passing the gas stream, under conditions in which the gas stream has a carbon dioxide partial pressure of at least about 30 psia and a $C_{3+}$ hydrocarbons combined partial pressure of at least about 30 psia, to the first membrane on the first feed side;

(c) withdrawing from the first feed side a first residue stream depleted in $C_{3+}$ hydrocarbons compared with the gas stream;

(d) withdrawing from the first permeate side a first permeate stream enriched in $C_{3+}$ hydrocarbons compared with the gas stream;

(e) providing a second membrane having a second feed side and a second permeate side and being selective for carbon dioxide over methane;

(f) passing the first residue stream to the second membrane and across the second feed side;

(g) withdrawing from the second feed side a second residue stream depleted in carbon dioxide compared with the first residue stream;

(h) withdrawing from the second permeate side a second permeate stream enriched in carbon dioxide compared with the first residue stream;

(i) providing a third membrane having a third feed side and a third permeate side and being selective for carbon dioxide over methane;

(j) passing the second permeate stream to the third membrane and across the third feed side;

(k) withdrawing from the third feed side a third residue stream depleted in carbon dioxide compared with the second permeate stream;

(l) withdrawing from the third permeate side a third permeate stream enriched in carbon dioxide compared with the second permeate stream;

(m) optionally recirculating at least a portion of the third residue stream for further treatment within the process;

(n) optionally recirculating at least a portion of the first permeate stream to step (b).

Such an embodiment can be used if no removal of $C_{3+}$ hydrocarbons prior to treatment in the membrane separation units is required. The first permeate stream will be enriched in $C_{3+}$ hydrocarbons compared with the feed stream, and may be treated, for example by compression/cooling/phase separation, to recover condensed hydrocarbons as an NGL stream.

A typical embodiment in which compression, cooling and phase separation steps are used upstream of the membrane separation units includes the following steps:

(a) compressing the gas stream;

(b) cooling the gas stream, thereby inducing condensation of a portion of $C_+$ hydrocarbons;

(c) separating the gas stream into a $C_{3+}$ hydrocarbon liquid phase and an uncondensed gas stream;

(d) providing a first membrane having a first feed side and a first permeate side and being selective for $C_{3+}$ hydrocarbons over methane;

(e) passing the uncondensed gas stream, under conditions in which the uncondensed gas stream has a carbon dioxide partial pressure of at least about 30 psia and a $C_{3+}$ hydrocarbons combined partial pressure of at least about 30 psia, to the first membrane on the first feed side;

(f) withdrawing from the first feed side a first residue stream depleted in $C_{3+}$ hydrocarbons compared with the uncondensed gas stream;

(g) withdrawing from the first permeate side a first permeate stream enriched in $C_{3+}$ hydrocarbons compared with the uncondensed gas stream;

(h) providing a second membrane having a second feed side and a second permeate side and being selective for carbon dioxide over methane;

(i) passing the first residue stream to the second membrane and across the second feed side;

(j) withdrawing from the second feed side a second residue stream depleted in carbon dioxide compared with the first residue stream;

(k) withdrawing from the second permeate side a second permeate stream enriched in carbon dioxide compared with the first residue stream;

(l) providing a third membrane having a third feed side and a third permeate side and being selective for carbon dioxide over methane;

(m) passing the second permeate stream to the third membrane and across the third feed side;

(n) withdrawing from the third feed side a third residue stream depleted in carbon dioxide compared with the second permeate stream;

(o) withdrawing from the third permeate side a third permeate stream enriched in carbon dioxide compared with the second permeate stream;

(p) optionally recirculating at least a portion of the third residue stream for further treatment within the process;

(q) optionally recirculating at least a portion of the first permeate stream to step (a).

Compression step (a) both facilitates condensation of hydrocarbons in step (b) and raises the gas stream to a suitable pressure for treatment in the subsequent membrane separation steps.

Cooling step (b) is typically carried out simply by air cooling. In general, it is not necessary to cool the gas stream to very low temperatures to knock out $C_{3+}$ hydrocarbons, because the hydrocarbon dew point is controlled by the subsequent membrane separation step.

Steps (a) and (b) give rise to a discrete liquid phase that includes the heavier hydrocarbons that have condensed under the prevailing pressure and temperature conditions, as well as dissolved hydrogen sulfide, if present, carbon dioxide, water and small amounts of dissolved light hydrocarbons. The condensed $C_{3+}$ hydrocarbons liquid is removed by means of a phase separator or the like in step (c).

In some situations, the condensed $C_{3+}$ hydrocarbons liquid has value as a natural gas liquids (NGL) product. If it is not required as a separate product of the process, the $C_{3+}$ hydrocarbons condensate stream can be remixed in whole or part with other liquid or gas streams available in the gas processing plant.

Other intermediate embodiments including any subset of steps (a), (b) and (c) may also be used. For example, if the raw feed stream is already a two-phase mixture containing entrained hydrocarbon liquids as mist or droplets, step (c) may be used, but steps (a) and (b) may not be required. As another example, if the gas is already at high pressure, step (a) may be omitted and steps (b) and (c) used to condense and knock out $C_{3+}$ hydrocarbons.

After the optional compression/cooling/phase separation steps, the uncondensed gas is then treated in three membrane separation steps, as in the basic embodiment.

The first membrane separation step uses a membrane that is selective in favor of $C_{3+}$ hydrocarbons over methane. Any membrane that provides such properties may be used. Rubbery polymeric membranes are preferred, and silicone rubber membranes are especially preferred, although other membranes are known that meet this criterion, including "super-glassy" polymer membranes and inorganic membranes, such as microporous carbon or ceramic membranes.

The membranes for this separation step may take any convenient form known in the art. If rubbery membranes are used, the preferred form is a composite membrane including a microporous support layer for mechanical strength and a thin rubbery coating layer that is responsible for the separation properties.

A benefit of using silicone rubber or similar rubbery membranes is that they are able to operate satisfactorily in the presence of combinations of water, carbon dioxide and $C_{3+}$ hydrocarbons. Therefore, the partial pressures of both the hydrocarbons and the water in the feed to the first membrane separation step may be high, even close to, at or beyond the saturation vapor pressures of those components. For example, the $C_{3+}$ hydrocarbons combined partial pressure may be at least about 30 psia, 50 psia, 75 psia or more.

Similarly, the carbon dioxide partial pressure may be relatively high, such as at least about 30 psia, 50 psia, 100 psia, 150 psia, 200 psia or above.

The feed gas may be reheated if desired before passing into the first membrane separation step, as discussed in more detail below.

A driving force for transmembrane permeation is provided by the pressure difference between the feed and permeate sides, which can be provided by compressing the feed stream (if it is not already at sufficiently high pressure), drawing a vacuum on the permeate side, or a combination of both.

$C_{3+}$ hydrocarbons, water vapor and some carbon dioxide simply pass into the permeate stream as preferentially permeating components, even if the membrane separation is performed at conditions close to, at or even beyond the water or hydrocarbon dew points.

This first permeate stream, enriched in $C_{3+}$ hydrocarbons, is usually, but not necessarily, recirculated to the front of the process where it may reenter the upstream compression/cooling steps, if used, to increase $C_{3+}$ hydrocarbon removal and recovery.

By preferentially removing heavier hydrocarbon components, the first membrane separation step reduces the hydrocarbon dew point of the gas, preferably by at least about 5° C. and most preferably by at least about 10° C. This dew point reduction helps to protect the membranes used in the subsequent membrane separation steps from damage by heavier hydrocarbons.

Since the heavier hydrocarbons are removed, this step may also be used to control the Btu value of the final product gas.

The residue stream from this step is lighter, drier and sweeter than the feed. Owing to cooling brought about by Joule-Thomson expansion across the membrane to the permeate side, the residue stream is also colder than the feed stream, and often substantially colder, such as 5° C. colder, 10° C. colder or more.

The residue stream passes as feed to the second membrane separation step. If a further relatively large feed-to-residue drop in temperature is anticipated in the second membrane step, it may be desirable to heat the residue stream before passing it into the second membrane separation step to ensure that the gas on the feed side remains above the dew point throughout the step.

However, as explained in more detail below, less heating is required than would be the case in a prior art membrane separation process using only cellulose acetate membranes, for example.

This is beneficial, as it allows the carbon dioxide separation steps to operate at a comparatively cool temperature, thereby enhancing the carbon dioxide/methane selectivity. The second membrane separation step may often be operated at a temperature no higher than about 60° C., 50° C., 40° C. or even lower, for example.

The second membrane separation step is equipped with membranes selective in favor of carbon dioxide over methane and other hydrocarbons. The membrane material used in this step is preferably a glassy polymer with good carbon dioxide/methane selectivity under conditions of high carbon dioxide partial pressure. Representative membrane materials that can be used for this step include polyimides, fluorinated dioxoles and dioxolanes, and cellulose acetate.

The membranes used for this second membrane separation step may again take any convenient form known in the art. Preferably the membranes are asymmetric membranes, having a thin skin that is responsible for the separation properties and an underlying integral microporous support layer, or composite membranes.

The second membrane separation step divides the gas stream into a carbon-dioxide-enriched permeate stream and a carbon-dioxide-depleted, methane-rich residue stream. One potentially valuable product of the process is the methane-rich second residue stream. Preferably, this stream meets target specifications to be useful as a product stream, such as an engine fuel stream, without needing substantial additional processing.

Preferably, this stream contains no more than about 10% carbon dioxide and more preferably no more than about 5% carbon dioxide. Most preferably, this gas stream meets pipeline specification of no more than about 2% carbon dioxide.

This product gas is provided from the high-pressure side of the membrane separation system, and is withdrawn and sent to the gas pipeline, for further purification, or elsewhere as desired.

If the raw gas stream has a relatively high carbon dioxide content, such as 8%, 10%, 15% or more, and it is desired to reduce the concentration of carbon dioxide in the second residue stream to no more than 2%, a relatively high stage-cut is needed in the second membrane separation step. Thus, in this case, besides being enriched in carbon dioxide, typically to at least about 40% or 45% carbon dioxide, the second permeate stream also contains substantial quantities of methane that have permeated with the carbon dioxide.

To achieve better overall methane recovery, this second permeate stream, after optional recompression, is passed as feed to the third membrane separation step. This step also contains membranes selective in favor of carbon dioxide over methane and other hydrocarbons. The membranes may, but need not be, the same as those used in the second membrane separation step. This step produces a third residue stream that is enriched in methane and depleted in carbon dioxide compared with the second permeate stream.

This third residue stream is preferably, but not necessarily, recirculated to the feed side of the second membrane separation step. When compared with the first residue stream, which is also treated in the second membrane separation step, the total hydrocarbon content of the third residue stream is made up of proportionately more methane and less $C_{3+}$ hydrocarbon, because the heavier components are preferentially retained on the feed side of the second membrane separation step.

Thus, besides increasing methane recovery, another result of recirculating the third residue stream is to lower the hydrocarbon dew point of the feed to the second membrane separation step.

The third permeate stream is the most carbon-dioxide rich stream of the process, and typically may contain at least about 40%, 45%, 50% or more carbon dioxide. If the process is primarily used to sweeten a raw natural gas stream to make a pipeline grade natural gas product, this stream may simply be a waste stream, and may be flared or otherwise disposed of as desired.

On the other hand, if the process is directed at recovering carbon dioxide from a gas stream generated by miscible flood enhanced oil recovery, the recovered carbon dioxide stream may be the principal product of the process. In this case, the carbon dioxide content of the stream is typically above 70%, such as at least about 75%, 80%, 90%, 95% or higher.

Heat integration within the process may be practiced as desired. In particular, the cold permeate or residue streams from the first membrane separation step may be used to cool the raw incoming gas if a lower temperature is needed in the cooling/condensation step.

Depending on the pressure at which the raw gas can be provided to the process, and the operating parameters of the process itself, one or two compression steps will usually be needed: (i) to recompress the second permeate stream for treatment in the third membrane separation step, and/or (ii) to raise the pressure of the incoming raw gas stream. It is often possible to divert a portion of the second permeate stream, or another process stream of suitable composition, for use as engine fuel to power such compressors.

Depending on the incoming raw gas composition, it may be possible to reach target specification for composition of the product stream without using the third membrane separation step.

In this aspect, a basic embodiment of the process of the invention includes the following steps for treating the raw gas stream:

(a) providing a first membrane having a first feed side and a first permeate side and being selective for $C_{3+}$ hydrocarbons over methane;

(b) passing the gas stream, under conditions in which the gas stream has a carbon dioxide partial pressure of at least about 200 psia and a $C_{3+}$ hydrocarbons combined partial pressure of at least about 30 psia, to the first membrane on the first feed side;

(c) withdrawing from the first feed side a first residue stream depleted in $C_{3+}$ hydrocarbons compared with the gas stream;

(d) withdrawing from the first permeate side a first permeate stream enriched in $C_{3+}$ hydrocarbons compared with the gas stream;

(e) providing a second membrane having a second feed side and a second permeate side and being selective for carbon dioxide over methane;

(f) passing the first residue stream to the second membrane and across the second feed side;

(g) withdrawing from the second feed side a second residue stream depleted in carbon dioxide compared with the first residue stream;

(h) withdrawing from the second permeate side a second permeate stream enriched in carbon dioxide compared with the first residue stream.

(i) optionally recirculating at least a portion of the first permeate stream to step (b).

In this aspect, a typical embodiment in which compression, cooling and phase separation steps are used upstream of the membrane separation units includes the following steps:

(a) compressing the gas stream;

(b) cooling the gas stream, thereby inducing condensation of a portion of $C_{3+}$ hydrocarbons;

(c) separating the gas stream into a $C_{3+}$ hydrocarbon liquid phase and an uncondensed gas stream;

(d) providing a first membrane having a first feed side and a first permeate side and being selective for $C_{3+}$ hydrocarbons over methane;

(e) passing the uncondensed gas stream, under conditions in which the uncondensed gas stream has a carbon dioxide partial pressure of at least about 200 psia and a $C_{3+}$ hydrocarbons combined partial pressure of at least about 30 psia, to the first membrane on the first feed side;

(f) withdrawing from the first feed side a first residue stream depleted in $C_{3+}$ hydrocarbons compared with the uncondensed gas stream;

(g) withdrawing from the first permeate side a first permeate stream enriched in $C_{3+}$ hydrocarbons compared with the uncondensed gas stream;

(h) providing a second membrane having a second feed side and a second permeate side and being selective for carbon dioxide over methane;

(i) passing the first residue stream to the second membrane and across the second feed side;

(j) withdrawing from the second feed side a second residue stream depleted in carbon dioxide compared with the first residue stream;

(k) withdrawing from the second permeate side a second permeate stream enriched in carbon dioxide compared with the first residue stream;

(l) optionally recirculating at least a portion of the first permeate stream to step (b).

As with the embodiment comprising three membrane separation steps, steps (a), (b) and (c) are all optional and may be used independently of each other or in any combination.

Embodiments comprising two membrane separation steps maybe useful, for example, when the raw gas is already very rich in carbon dioxide, such as containing 50% or more carbon dioxide, and the desired product is the second permeate stream, which may be enriched to a carbon dioxide content of at least about 60%, 70% or more.

In another aspect, the invention is a system or apparatus for carrying out removal of carbon dioxide from natural gas or other hydrocarbon-containing gas. In this aspect, the invention includes the following elements:

(a) a first compressor having a compressor inlet line and a compressor outlet line;

(b) cooling means positioned in the compressor outlet line for cooling compressed gas passing through the compressor outlet line;

(c) a phase separator positioned in the compressor outlet line such that condensed liquids can be removed from compressed, cooled gas;

(d) a first membrane separation unit containing a first membrane selective for $C_{3+}$ hydrocarbons over methane, and having a first feed side and a first permeate side, the first membrane separation unit being connected to the phase separator such that gas can flow from the phase separator to and across the first feed side of the first membrane;

(e) a recirculation line connecting the first permeate side and the compressor inlet line;

(f) a second membrane separation unit containing a second membrane selective for carbon dioxide over methane, and having a second feed side and a second permeate side, the second membrane separation unit being connected to the first membrane separation unit such that gas can flow from the first feed side to and across the second feed side;

(g) a third membrane separation unit containing a third membrane selective for carbon dioxide over methane, and having a third feed side and a third permeate side, the third membrane separation unit being connected to the second membrane separation unit such that gas can flow from the second permeate side to and across the third feed side, and from the third feed side to and across the second feed side;

(h) a second compressor connected between the second and third membrane separation units such that gas leaving the second permeate side can be compressed before flowing to the third feed side.

DETAILED DESCRIPTION OF THE INVENTION

The term gas as used herein means a gas or a vapor.

The term $C_{2+}$ hydrocarbon means a hydrocarbon having at least two carbon atoms; the term $C_{3+}$ hydrocarbon means a hydrocarbon having at least three carbon atoms; and so on.

The term heavier hydrocarbons means $C_{3+}$ hydrocarbons.

The term light hydrocarbons means $C_1$–$C_6$ hydrocarbons.

The terms two-step and multistep as used herein with regard to a membrane separation unit mean an arrangement of membrane modules or banks of membrane modules connected together such that the residue stream from one module or bank of modules becomes the feedstream for the next.

The terms two-stage and multistage as used herein with regard to a membrane separation unit mean an arrangement of membrane modules or banks of membrane modules connected together such that the permeate stream from one module or bank of modules becomes the feedstream for the next.

The term stage-cut means the ratio of permeate flow to feed flow for a membrane unit, in other words the volume fraction of the feed gas that permeates the membrane.

The term pressure ratio means the ratio of total pressure of the feed gas to total pressure of the permeate gas for a membrane unit.

All percentages herein are by volume unless otherwise stated.

The invention is a process and apparatus for separating carbon dioxide from gas, especially natural gas, that also contains $C_{3+}$ hydrocarbons. The invention uses two or three membrane separation steps, optionally in conjunction with cooling/condensation and phase separation under pressure, to yield a lighter, sweeter product natural gas stream, and/or a carbon dioxide stream of reinjection quality and/or a natural gas liquids (NGL) stream.

Figure 1:
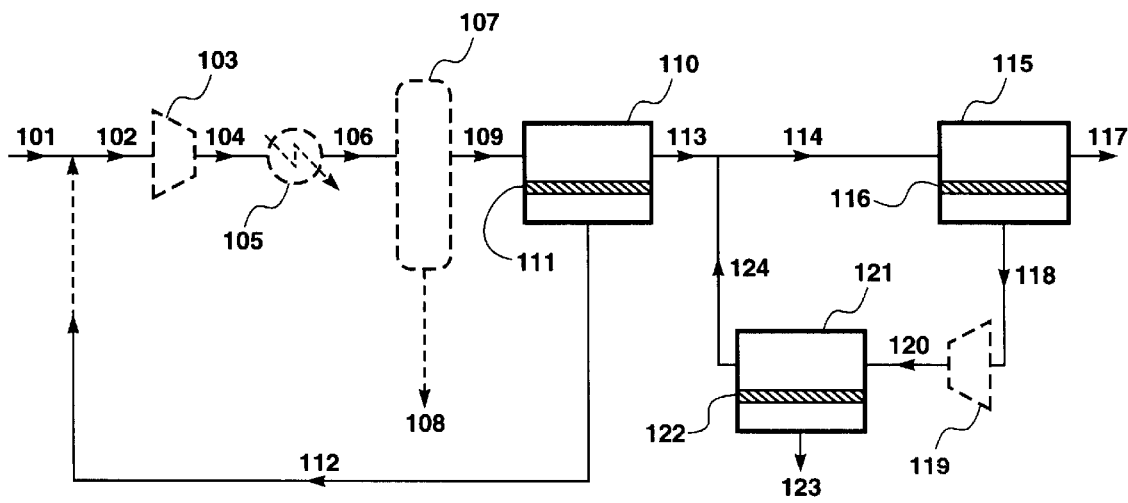
FIG. 1 is a schematic drawing of a basic embodiment of the invention, including optional compression, cooling and phase separation of the incoming raw gas stream.

A basic representative process of the invention is shown in schematic form in FIG. 1. Components shown by dashed lines indicate optional elements of the process.

The process as shown may be carried out at individual wellheads or on pooled gas at intermediate stations or central gas-processing facilities. It will be appreciated by those of skill in the art that this and the other figures are very simple schematic diagrams, intended to make clear the key aspects of the invention, and that an actual process train will usually include many additional components of a standard type, such as heaters, chillers, condensers, pumps, blowers, other types of separation and/or fractionation equipment, valves, switches, controllers, pressure-, temperature-level- and flow-measuring devices and the like.

Turning specifically to FIG. 1, raw gas stream, 101, may be any natural gas, or indeed any hydrocarbon-containing gas, from which it is desired to remove carbon dioxide, $C_{3+}$ hydrocarbons and optionally hydrogen sulfide or water vapor. The gas may be from a natural gas well, may be associated gas produced in conjunction with oil, either spontaneously or as a result of carbon dioxide injection, may be gas gathered from a landfill, or may arise from any other source.

Stream 101 maybe as-extracted from the ground or may have been subjected to pretreatment of any kind, including, but not limited to, filtration to remove particulates, entrained water or hydrocarbon liquids, separation by any means, including, but not limited to absorption, adsorption, condensation and other membrane or non-membrane separation, to remove gaseous contaminants, such as acid gases, $C_{3+}$ hydrocarbon vapors, nitrogen or water vapor. Stream 101 is typically at above atmospheric pressure, such as at a few hundred psia, and may or may not be at sufficiently high pressure for the desired process performance.

The content of carbon dioxide in stream 101 may be any amount, ranging from, for example, a few percent, such as about 4% or 5%, up to about 50%, 60%, 70% or more.

Natural gas pipeline specification for carbon dioxide is usually no more than about 2%. If the process is directed at treating carbon-dioxide-containing gas from a natural gas well, therefore, stream 101 will usually contain at least 2% carbon dioxide. The process is particularly well suited to treat gas containing at least about 8% carbon dioxide or more, such as 10%, 15% or 20%.

If the process is directed at treating gas generated by miscible flood enhanced oil recovery, carbon dioxide may be the major component of the stream, that is, the stream may contain at least about 50% carbon dioxide, and the carbon dioxide content may be as high as 70% or more.

Usually, stream 101 also contains $C_{3+}$ hydrocarbons and water vapor, and these also may be present in any quantities. Therefore, the partial pressures of both the hydrocarbons and the water in the feed may be close to the saturation vapor pressures of those components at the temperature of stream 101.

For example, depending on the mix of hydrocarbons and the temperature of the gas, the aggregate partial pressure of all $C_{3+}$ hydrocarbons in the gas might be as much as 30 psia, 50 psia, 75 psia, 100 psia or more. Expressed as a percentage of the saturation vapor pressure at that temperature, the partial pressure of hydrocarbons, particularly $C_{3+}$ hydrocarbons, may be 20%, 50%, 80% or more of saturation, for example.

The typical water content is up to about 1,200 ppm.

The other most significant component of the stream is methane, frequently, but not necessarily, the major component, and the stream may typically contain a number of other components, such as ethane, hydrogen sulfide and/or inert gases such as helium and argon in minor or trace amounts.

As mentioned above, raw gas stream 101 is typically at elevated pressure. If it is at insufficiently high pressure to operate the process satisfactorily, stream 101 may optionally be compressed, as shown in FIG. 1. Stream 101 is combined with optional recirculation stream 112, described below, to form combined feed stream 102, which passes into compression step, 103.

The compressor used in compression step 103 may be of any convenient type, such as centrifugal, screw or reciprocating, based on considerations of outlet pressure needed, gas flow rate and composition, and like issues familiar to those of skill in the art. Screw compressors are relatively inexpensive and are widely used to reach pressures up to about 300 or 400 psia; for higher pressures, piston compressors are more commonly used.

Typically, but not necessarily, the compression step raises the pressure of the gas stream between about 3-fold and 10-fold. This may be done in a single-stage or multiple-stage compressor, as is well known in the art.

For most applications of the process, it is neither necessary nor desirable to compress the feed gas to very high pressures. Most preferably, compression step 103 raises the pressure of stream 102 to between about 500 psia and 1,500 psia.

As mentioned already, it is convenient, desirable, and generally possible to use fuel gas generated by the process to power a gas engine to drive the compressor. This provides a cost advantage that is one of the attractive features of the process.

Gas emerges from compression step 103, if used, as compressed stream, 104, and is passed to optional cooling step 105. If a compression step is used, the compressor exhaust gas is hot and an after-cooling step will be needed, as is well known and practiced in the art. If the compression step is not used, the cooling step 105 is optional.

Most conveniently, the cooling step is carried out by simple air cooling. If a lower temperature than can be attained by air cooling is desired, the step may be carried out using cooling water, refrigerants and/or heat exchange against other plant streams, for example. Such techniques are familiar to those of skill in the art.

Cooling typically results in the formation of a liquid phase, containing condensed $C_{3+}$ hydrocarbons, water or both. Two-phase stream 106 is passed into optional phase separation step 107.

Optional phase separation step 107 is typically used upstream of membrane separation step 110 if raw gas stream 101 is a two-phase mixture containing entrained hydrocarbon liquids as mist or droplets, or if compression step 103 and/or cooling step 105 have been used.

In FIG. 1, step 107 is shown as producing a single liquid phase, 108, and gas phase, 109, as will be the case if a simple knock-out drum or two-phase separator is used. Alternatively, a three-phase separator may be used to produce discrete liquid water and natural gas liquids (NGL) streams.

If the NGL stream is required as a separate product of the process, it is withdrawn and may be stabilized by flashing off light components, trucked off-site for further treatment, stored for sale or the like. If the NGL is not required, it may be remixed with other liquid or gas streams available in the gas processing plant or otherwise disposed of as desired.

The gas phase is withdrawn from the phase separation step, if used, as stream 109 and passed to first membrane separation step 110.

This step is carried out using a membrane separation unit containing a membrane, 111, that is selective for $C_{3+}$ hydrocarbons over methane. To provide such selectivity, the membrane is preferably made from an elastomeric or rubbery polymer. Examples of polymers that can be used to make elastomeric membranes, include, but are not limited to, nitrile rubber, neoprene, polydimethylsiloxane (silicone rubber), chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers, polyamides and polyesters. Silicone rubber is the most preferred material for separating $C_{3+}$ hydrocarbons from methane.

Less preferably, membrane 111 can be made from a super-glassy polymer. Super-glassy polymers have a rigid structure, high glass transition temperatures, typically above 100° C., 200° C. or higher, and have unusually high free volume within the polymer material. These materials have been found to exhibit anomalous behavior for glassy polymers, in that they preferentially permeate larger, more condensable, organic molecules over smaller inorganic or less condensable organic molecules. Use of such polymers to separate condensable components from lower-boiling, less condensable components is described in U.S. Pat. No. 5,281,255, for example.

Yet another alternative is to use finely microporous inorganic membranes, such as the adsorbent carbon membranes described in U.S. Pat. No. 5,332,424, the pyrolysed carbon membranes described in U.S. Pat. No. 4,685,940, or certain ceramic membranes. These membranes are, in general, more difficult to make and less readily available than polymeric membranes, and are less preferred, although they may be useful in some circumstances.

The membrane may take the form of a homogeneous film, an integral asymmetric membrane, a multilayer composite membrane, a membrane incorporating a gel or liquid layer or particulates, or any other form known in the art. If elastomeric membranes are used, the preferred form is a composite membrane including a microporous support layer for mechanical strength and a rubbery coating layer that is responsible for the separation properties. If super-glassy membranes are used, they may be formed as integral asymmetric or composite membranes.

The membranes maybe manufactured as flat sheets or as fibers and housed in any convenient module form, including spiral-wound modules, plate-and-frame modules and potted hollow-fiber modules. The making of all these types of membranes and modules is well known in the art. Flat-sheet membranes in spiral-wound modules is the most preferred choice.

Membrane separation step 110 is usually carried out using a membrane unit equipped with one or more membrane modules in a single-stage arrangement, although an array of modules in a multistep or multistage arrangement, as is known in the art, may be used if desired.

Feed stream 109 enters the membrane separation unit and flows across the surface of membrane 111 on the feed side. Usually stream 109 can be introduced into the membrane separation step at the temperature and pressure at which it exits the phase separation step, if used. Although this means that the stream is typically at or close to saturation with $C_{3+}$ hydrocarbons and water, the membranes used in step 110 are not damaged by these components, which permeate preferentially and thus are not concentrated on the membrane surface.

Optionally, for example if the Joule-Thompson cooling in step 110 is expected to exceed the reduction in dew point, stream 109 may be warmed to a temperature that will keep it above the final dew point at the residue end of the membrane modules.

The permeate side of the membrane is maintained at lower pressure than the feed gas to provide a driving force for transmembrane permeation.

Typically a pressure ratio (feed pressure:permeate pressure) in the range between about 3 and 30 is preferred, and between about 5 and 20 is most preferred, for this and the other membrane separation steps in the process.

$C_{3+}$ hydrocarbons, acid gases and water vapor all permeate the membrane preferentially over methane, resulting in $C_{3+}$ hydrocarbon-enriched permeate stream 112 and $C_{3+}$ hydrocarbon-depleted residue stream 113.

FIG. 1 shows permeate stream 112 as being recirculated to the front of the process and mixed with the raw gas stream 101. Such an arrangement is preferred if step 107 is used. The result is to increase the recovery of NGL in stream 108, and of carbon dioxide in stream 123.

If step 107 is not used, and an NGL product is desired, NGL may be recovered from stream 112 by sending stream 112 to compression, cooling and phase separation steps. If desired, the gas phase from the phase separator may then be recirculated to the front of the process at the inlet to the feed side of membrane separation step 110.

Otherwise, stream 112 may be discharged from the process and used as fuel, flared, mixed with other streams of similar composition or disposed of in any convenient manner.

Residue stream 113 is withdrawn from the high-pressure, feed side of the membranes. This stream is usually at essentially the same pressure as feed stream 109, subject only to any slight pressure drop along the modules. Because $C_{3+}$ hydrocarbons have been removed preferentially, however, the hydrocarbon dew point of this gas is substantially lower than that of stream 109, such as 5° C. lower, 10° C. lower or more.

As a result of Joule-Thomson cooling effects in step 110, the feed gas cools as it passes down the module and residue stream 113 is usually significantly colder than feed stream, such as at least about 5° C. cooler, at least about 10° C. cooler, or more. In general, the higher the concentration of $C_{3+}$ hydrocarbons and carbon dioxide in the feed gas, the greater will be the cooling produced by Joule-Thomson expansion, and the lower will be the resulting temperature of streams 112 and 113.

Further Joule-Thomson expansion and cooling will take place as gas passes through membrane separation step 115. In addition, the hydrocarbon dew point of the gas passing along the feed side of the membranes will increase as carbon dioxide is removed preferentially. The combination of a drop in the gas temperature and an elevated hydrocarbon dew point poses a risk of condensation of hydrocarbons within the membrane modules of step 115.

If the most preferred dioxole or dioxolane membranes discussed below are used, the membranes offer much greater resistance to damage by liquid hydrocarbons than is the case if cellulose acetate or polyimide membranes are used. Nevertheless, if the expected gas compositions and temperatures render the possibility of condensation likely, it is preferred to heat stream 114 to a temperature above the expected final hydrocarbon dew point of stream 117.

Residue stream 113 is often combined with recycle stream 124, as discussed below, and sent as feed stream, 114, to second membrane separation step, 115.

This step is carried out using a membrane separation unit equipped with a membrane, 116, that is selective in favor of carbon dioxide over methane and other hydrocarbons. The membrane material used in this step is preferably a glassy polymer with good carbon dioxide/methane selectivity under conditions of high carbon dioxide partial pressure. Representative membrane materials that can be used for this step include cellulose acetate, other cellulose derivatives, polyimides, and fluorinated dioxoles and dioxolanes.

Despite their susceptibility to water, hydrogen sulfide and heavy hydrocarbons, cellulose acetate membranes are still the most widely used membranes in industrial carbon dioxide separation units. They typically provide a carbon dioxide/methane selectivity of about 10 under real operating conditions. Such membranes are available commercially from Kvaerner Process Systems of Houston, Texas, or as Separex Membrane Systems from UOP of Des Plaines, Ill.

As the raw gas has already been treated in cooling/phase separation steps 105/107 and first membrane separation step 110, gas stream 114 may be sufficiently dry, light and sweet that cellulose acetate membranes may be used. Alternative candidate membranes of this type include those made from different cellulose derivatives, such as ethylcellulose, methylcellulose, nitrocellulose, and particularly other cellulose esters.

Other preferred materials for membrane 116 are modern polyimides that exhibit resistance to plasticization or swelling when exposed to high partial pressures of carbon dioxide and $C_{3+}$ hydrocarbons, in conjunction with good carbon dioxide/methane selectivity and carbon dioxide permeability. As a non-limiting example, certain polyimides based on 6FDA may be used. For example, the polyimide 6FDA-MPDA has a carbon dioxide/methane selectivity of about 50 as measured in $C_{3+}$ hydrocarbon-free gas mixtures, and may provide a selectivity of about 10 or above under real operating conditions.

Other specific polyimides with appropriate properties are taught in U.S. Pat. Nos. 4,880,442 (to E. I. Du Pont de Nemours) and 5,141,642 (to Ube Industries), both of which are incorporated herein by reference in their entirety.

Polyimide membranes are available commercially from Ube Industries, of Ube City, Japan, or from Medal L P, of Newport, Del., a division of Air Liquide.

The most preferred membranes 116 for use in step 115 are made from glassy polymers characterized by having repeating units of a fluorinated, non-aromatic cyclic structure, the ring having at least five members, and further characterized by a fractional free volume no greater than about 0.3. Preferred polymers in this group are formed from fluorinated monomers of (i) dioxoles, which are five-member rings of the form

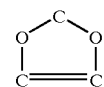

that polymerize by opening of the double bond, or (ii) dioxolanes, similar five-member rings but without the double bond in the main ring, or (iii) aliphatic structures having an alkyl ether group, polymerizable into cyclic ether repeat units with five or six members in the ring. The polymers may take the form of homopolymers or copolymers.

Such materials are discussed at length in U.S. Pat. No. 6,572,680, entitled "Carbon Dioxide Gas Separation Using Organic-Vapor-Resistant Membranes", and in U.S. Pat. No.

6,361,583, both of which are incorporated herein by reference in their entirety.

Specific preferred materials in this group are copolymers of tetrafluoroethylene with 2,2,4-trifluoro-5-trifluoromethoxy-1,3-dioxole having the structure:

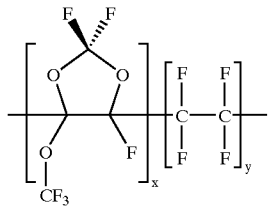

where x and y represent the relative proportions of the dioxole and the tetrafluoroethylene blocks, such that x+y=1.

Such materials are available commercially from Ausimont S.p.A., of Milan, Italy under the trade name Hyflon® AD. Different grades are available varying in proportions of the dioxole and tetrafluoroethylene units.

A second preferred material of this type has the structure:

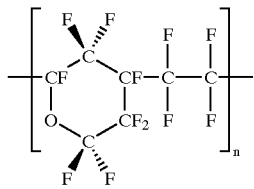

where n is a positive integer.

This material is available commercially from Asahi Glass Company, of Tokyo, Japan under the trade name Cytop®.

As yet another highly preferred alternative, membranes suitable for use in the invention are characterized by a fractional free volume no greater than about 0.3, a glass transition temperature, Tg, of at least about 100° C., and a fluorine:carbon ratio of at least 1:1, but need not necessarily include a cyclic structure. Such materials are discussed at length in U.S. Pat. No. 6,572,680, entitled "Carbon Dioxide Gas Separation Using Organic-Vapor-Resistant Membranes", and in U.S. Pat. No. 6,361,582, both of which are incorporated herein by reference in their entirety.

For carbon dioxide over methane, the most preferred membranes can provide typical selectivities of 10, 15 or more under real operating conditions. Such selectivities are remarkable, in that they can be achieved even in the presence of significant concentrations of $C_{3+}$ hydrocarbons and/or carbon dioxide, and at high feed pressure.

The membranes used for this second membrane separation step may again take any convenient form known in the art. Preferably the membranes are asymmetric membranes, having a thin skin that is responsible for the separation properties and an underlying integral microporous support layer, or composite membranes.

Second membrane separation step 115 divides the gas stream into a carbon-dioxide-enriched permeate stream, 118, and a carbon-dioxide-depleted, methane-rich residue stream, 117.

Residue stream 117 is usually the most carbon-dioxide-lean and methane-rich stream produced by the process. If the principal goal of the process is to upgrade raw natural gas to pipeline specification, stream 117 maybe the primary product of the process. Preferably, this stream contains no more than about 10% carbon dioxide and more preferably no more than about 5% carbon dioxide. To meet pipeline specification, it is most preferable that this stream contains no more than about 2% carbon dioxide.

However, especially if the raw gas contains large amounts of carbon dioxide, it is not uncommon that stream 117 may still contain too much carbon dioxide to pass directly to the pipeline. In this case, stream 117 may be passed to one or more additional membrane separation steps or stages, an amine absorption step or any other process suitable for further reducing the carbon dioxide content.

This product gas is provided from the high-pressure side of the membrane separation system, and is withdrawn and sent to the gas pipeline, for further purification, or elsewhere as desired.

If the principal goal of the process is to treat a gas stream from a miscible flood operation to recover carbon dioxide for reinjection, residue stream 117 may be, for example, simply a waste stream that is sent to flare or may be used as fuel gas within the process, such as to run an engine to drive compression step 119 or 103.

Permeate stream 118 is passed for further treatment to third membrane separation step 121. Thus, steps 115 and 121 form a two-stage membrane arrangement. Since adequate pressure ratio must be maintained across step 115, the pressure of stream 118 is usually relatively low, so the stream is typically recompressed, most preferably to a pressure similar to that of stream 113, in optional compression step 119.

Compressed stream, 120, passes as feed into membrane separation step 121. Like step 115, step 121 is carried out using a membrane separation unit equipped with a membrane, 122, that is selective in favor of carbon dioxide over methane and other hydrocarbons. Membrane materials and preferences for this step are, therefore, the same as for step 115, although the two steps need not necessarily contain the same type of membranes.

Step 121 divides stream 120 into further carbon-dioxide-enriched permeate stream, 123, and carbon-dioxide-depleted, methane-enriched residue stream 124.

Residue stream 124 is preferably recirculated, in whole or part, within the process to increase methane recovery. Non-limiting suitable destinations for stream 124 are the feed inlet side of second membrane separation step 115, as shown in FIG. 1, or the feed inlet side of first membrane separation step 110 (not shown). Otherwise all or part of stream 124 may be used as fuel, flared or mixed with other gas streams, for example.

Stream 123 is usually the most carbon-dioxide-rich stream produced by the process. If the principal goal of the process is to recover purified carbon dioxide, then this may be the principal product of the process.

If the goal is to recover carbon dioxide for reinjection in an enhanced oil recovery operation, stream 123 is most preferably of a high enough carbon dioxide content, such as at least about 75% carbon dioxide, at least about 85% carbon dioxide, at least about 90% carbon dioxide, or at least about 95% carbon dioxide, that it can be reinjected without further treatment.

Alternatively, stream 123 may be sent for further purification, used as fuel, flared, or otherwise disposed of as desired.

Figure 2:
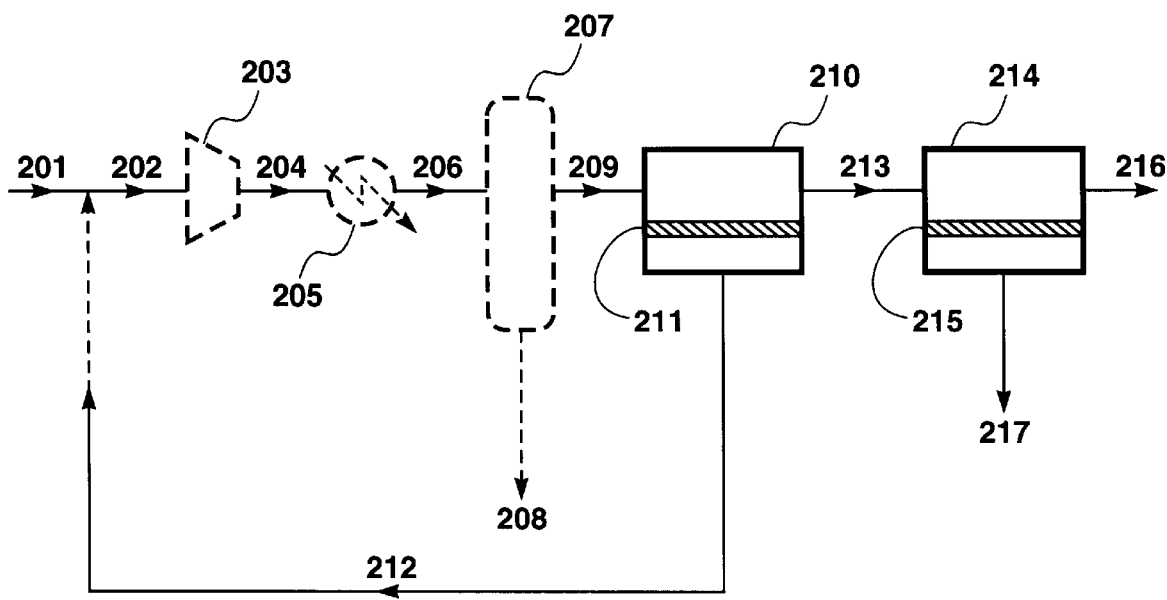
FIG. 2 is a schematic drawing of an embodiment of the invention without a third membrane separation step.

FIG. 2 shows an alternative embodiment of the invention in which only two membrane separation steps are used. As with FIG. 1, this is a simple schematic diagram, and other standard components may be included.

Unless otherwise indicated, parameter preferences and comments, such as those relating to membrane type, selectivity, gas temperatures at the inlets of the individual membrane separation steps, feed and permeate pressures and pressure ratio, and product stream compositions, for FIG. 2 are the same as those for FIG. 1.

Turning to FIG. 2, raw gas stream, 201, is optionally mixed with recirculation stream 212, to form stream 202, and passes into optional compression step, 203, emerging as compressed stream, 204. As described with respect to FIG. 1, stream 201 may be any hydrocarbon-containing gas, from which it is desired to remove carbon dioxide and $C_{3+}$ hydrocarbons.

This embodiment, however, is best suited to gas streams that contain either relatively low concentrations of carbon dioxide, such as no more than about 8%, or very high concentrations of carbon dioxide, such as at least about 40%, at least about 50% or at least about 60%.

If raw gas stream 201 is a natural gas stream that is only slightly out of specification for carbon dioxide, for example, containing 5% or 6% carbon dioxide, the process configuration of FIG. 2 may be used to bring the stream into specification without losing too much methane into the permeate stream.

At the other end of the scale, if raw gas stream 201 is gas from miscible flood enhanced oil recovery, the process configuration of FIG. 2 may be used to recover carbon dioxide of sufficient quality to be reinjected.

Stream 201 is optionally combined with recirculation stream 212, described below, to form combined feed stream 202. If stream 202 requires compression, it passes into compression step, 203. As with the embodiment of FIG. 1, any type of compressor may be used for step 203, and the pressure of stream 202 is typically raised by between about 3-fold and 10-fold in the compression step, to a pressure preferably between about 500 psia and 1,500 psia.

Preferably, a portion of a gas stream generated by the process is used as engine fuel to drive the compression step.

High-pressure stream, 204, is passed to optional cooling step 205, which may be carried out in any convenient manner, but most preferably by simple air cooling, and cooled stream 206, is passed into optional phase separation step 207. As with the embodiment of FIG. 1, this step may be carried out to simply separate liquid phase, 208, and gas phase, 209, or may employ a three-phase separator to produce discrete hydrocarbon and aqueous liquid phases (not shown).

Also as with the embodiment of FIG. 1, steps (a), (b) and (c) are all optional and may be used independently of each other.

The gas phase 209, after heating if desired, is passed to first membrane separation step 210, which is carried out using a membrane separation unit containing a membrane, 211, that is selective for $C_{3+}$ hydrocarbons over methane. As with the embodiment of FIG. 1, the most preferred membranes for use in this step are silicone rubber membranes. Since the feed gas is likely to contain large quantities of carbon dioxide in this embodiment, the partial pressure of carbon dioxide in stream 209 is likely to be high, such as at least about 200 psia.

Feed stream 209 enters the membrane separation unit and flows across the surface of membrane 211 on the feed side. A transmembrane driving force is provided by a pressure difference between feed and permeate sides. Under this driving force, $C_{3+}$ hydrocarbons, acid gases and water vapor all permeate the membrane preferentially over methane, resulting in $C_{3+}$ hydrocarbon-enriched permeate stream 212 and $C_{3+}$ hydrocarbon-depleted residue stream 213.

Stream 212 is optionally recirculated to the front of the process and mixed with the raw gas stream 201. Otherwise, as described with respect to FIG. 1, stream 212 may be sent for recovery of NGL by condensation, and uncondensed gas may be returned to the front of the process, or stream 212 may be used or disposed of in whole or part in any manner.

Residue stream 213 is withdrawn from the high-pressure, feed side of the membranes. The hydrocarbon dew point of this gas is typically substantially lower than that of stream 209, such as 5° C. lower, 10° C. lower or more. The gas stream is also typically colder than stream 209, and optionally may be warmed, as discussed above with respect to FIG. 1, before passing into second membrane separation step, 214.

This step is carried out using a membrane separation unit equipped with a membrane, 215, that is selective in favor of carbon dioxide over methane and other hydrocarbons. As with the embodiment of FIG. 1, the most preferred membranes for this step are fluorinated dioxole or dioxolane membranes, although other materials, such as cellulose acetate or polyimides, may be used.

Second membrane separation step 214 divides stream 213 into a carbon-dioxide-enriched permeate stream, 217, and a carbon-dioxide-depleted, methane-rich residue stream, 216.

Either or both of these streams may be desired products of the process and may be recovered and used or disposed of as appropriate.

In another aspect, the invention is a system or apparatus for carrying out removal of carbon dioxide from natural gas or other hydrocarbon-containing gas according to the configurations of FIGS. 1 or 2.

In this regard, permeate return line 112 or 212 is connected to raw gas inlet line 101 or 201, forming feed line 102 or 202. The feed line is connected to the inlet, suction side of compressor 103 or 203. Compressor outlet or exhaust line 104 or 204 passes into cooler 105 or 205, and cooler outlet line 106 or 206 is connected to phase separator 107 or 207.

Liquid removal line 108 or 208 enables collected liquids to be withdrawn from the phase separator. Gas phase outlet line 109 or 209 is connected on the feed inlet side to membrane separation unit 110 or 210.

The membrane unit is equipped with membranes 111 or 211, selective in favor of $C_{3+}$ hydrocarbons and water vapor over methane. The most preferred membranes for use in this membrane separation unit are silicone rubber membranes.

Residue outlet line 113 or 213 enables gas to be withdrawn from the feed side of the unit, and permeate outlet line 112 or 212 enables gas to be withdrawn from the permeate side.

In FIG. 2, residue outlet line 213 is connected on the feed inlet side to second membrane separation unit 214. This membrane unit is equipped with membranes 215, selective in favor of carbon dioxide over methane and other hydrocarbons. The most preferred membranes for use in this membrane separation unit are those in which the polymer has a repeat unit comprising a fluorinated cyclic structure, and particularly fluorinated dioxole or dioxolane membranes.

Optionally, and preferably, the apparatus includes a heat exchanger, heater or other warming means between the first and second membrane separation units for warming the residue gas exiting the first membrane unit before it is passed into the second membrane unit.

Residue outlet line 216 enables gas to be withdrawn from the feed side of the unit, and permeate outlet line 217 enables gas to be withdrawn from the permeate side.

In FIG. 1, residue return line 124 is connected to residue outlet line 113, forming second unit feed line 114, which is connected to second membrane separation unit 115 on the feed inlet side. This membrane unit is equipped with membranes 116, selective in favor of carbon dioxide over methane and other hydrocarbons. The most preferred membranes for use in this membrane separation unit are those in which the polymer has a repeat unit comprising a fluorinated cyclic structure, and particularly fluorinated dioxole or dioxolane membranes.

Optionally, and preferably, the apparatus includes a heat exchanger, heater or other warming means between the first and second membrane separation units for warming the residue gas exiting the first membrane unit before it is passed into the second membrane unit.

Residue outlet line 117 enables gas to be withdrawn from the feed side of the unit, and permeate outlet line 118 enables gas to be withdrawn from the permeate side.

Line 118 is connected to the inlet, suction side of compressor 119, and compressor exhaust line 120 is connected to third membrane separation unit 121 on the feed inlet side. This membrane unit is equipped with membranes 122, selective in favor of carbon dioxide over methane and other hydrocarbons. These membranes may be the same as or different from those in unit 115, and again are most preferably membranes in which the polymer has a repeat unit comprising a fluorinated cyclic structure, and particularly fluorinated dioxole or dioxolane membranes.

Residue outlet line 124 enables gas to be withdrawn from the feed side of the unit, and is connected to line 113 to form line 114. Permeate outlet line 123 enables gas to be withdrawn from the permeate side.

The invention is now further described by the following examples, which are intended to be illustrative of the invention, but are not intended to limit the scope or underlying principles in any way.

EXAMPLES

Example 1

A computer calculation was performed to demonstrate the process of the invention according to the embodiment of FIG. 1. A raw gas of flow rate 10 MMscfd was assumed to be delivered to the process at 200 psia and to be of the following mole percent composition:

| | |
|---|---|
| Carbon Dioxide | 50.0% |
| Methane | 33.5% |
| Ethane | 6.0% |
| Propane | 4.0% |
| n-Butane | 3.0% |
| n-Hexane | 2.0% |
| Water | 0.1% |
| Hydrogen Sulfide | 0.5% |
| Nitrogen | 0.9% |

The gas was assumed to be compressed to 1,000 psia in compression step 103 and to be cooled to 30° C. in cooling step 105. Thus, gas stream 109, emerging saturated with $C_{3+}$ hydrocarbons from phase separation step 107, has a hydrocarbon dew point of 30° C.

The pressure on the permeate side of all membrane separation steps was assumed to be 200 psia, and stream 120 was assumed to be recompressed to 1,000 psia in compression step 119.

As can be seen from the calculations, considerable cooling (10° C.) owing to the Joule-Thomson effect takes place between streams 109 and 113 in membrane separation step 110, as a result of which the gas temperature may fall below the dew point.

To avoid condensation of liquids within the membrane modules, stream 109 was assumed to be heated to 35° C., sufficient to keep all components of the stream passing across the membranes in the gas phase throughout step 110.

Stream 113 emerges from step 110 at 25° C. and was calculated to have a dew point of 23° C. After mixing with stream 124, this results in a hydrocarbon dew point of 19° C. for stream 114. To compensate for the substantial Joule-Thomson cooling that occurs in membrane separation step 115, stream 114 was assumed to be heated to 60° C. before being passed into step 115.

The results of the calculation are shown in Table 1. Stream numbers refer to FIG. 1.

As can be seen, the process produces about 30,000 gal/day of raw NGL at 1,000 psia. This stream contains substantial amounts of carbon dioxide, methane and ethane and could be sent for stabilization by flashing off these light components at 200 or 300 psia, for example.

The flash gas, rich in carbon dioxide and methane, could be returned into the process at the feed side of step 121 to increase carbon dioxide recovery.

The recovered liquefied $C_{3+}$ hydrocarbons represent less than 35 mol %, but close to 80 wt %, of stream 108.

The process also produces a 4.1 MMscfd carbon dioxide product stream, 123, containing 95% carbon dioxide. This stream is of sufficient quality to be used as injection gas in enhanced oil recovery.

Stream 117 is the third stream produced by the process. This stream has a hydrocarbon dew point of 39° C. and contains 10% carbon dioxide. The relatively high hydrocarbon dew point is brought about because so much carbon dioxide was originally present in the stream and has been removed. The gas could be subjected to further treatment, such as by cooling/condensation and/or membrane separation to reduce the $C_{3+}$ hydrocarbon content, and such as by amine scrubbing or further membrane separation to meet carbon dioxide pipeline specification.

Alternatively the stream, in whole or part, could be mixed with other plant streams, used as fuel or flared.

TABLE 1

| Parameter | Stream 101 | Stream 102 | Stream 104 | Stream 108 | Stream 109 | Stream 112 | Stream 113 | Stream 124 | Stream 114 | Stream 117 | Stream 118 | Stream 120 | Stream 123 |
|---|---|---|---|---|---|---|---|---|---|---|---|---|---|
| Mass Flow (MMscfd) | 10.0 | 12.2 | 12.2 | 29,400 gal/day | 11.0 | 2.2 | 8.8 | 1.8 | 10.6 | 4.6 | 5.9 | 5.9 | 4.1 |
| Temperature (° C.) | 35 | 34 | 147 | 30 | 35 | 30 | 25 | −2 | 60 | 41 | 50 | 40 | 19 |
| Dew point (° C.) | | | | | 30 | | 23 | | 19 | 39 | | | |
| Pressure (psia) | 200 | 200 | 1,000 | 1,000 | 1,000 | 200 | 1,000 | 1,000 | 1,000 | 1,000 | 200 | 1,000 | 200 |

TABLE 1-continued

| Parameter | Stream 101 | Stream 102 | Stream 104 | Stream 108 | Stream 109 | Stream 112 | Stream 113 | Stream 124 | Stream 114 | Stream 117 | Stream 118 | Stream 120 | Stream 123 |
|---|---|---|---|---|---|---|---|---|---|---|---|---|---|
| Component (mol %) | | | | | | | | | | | | | |
| Carbon Dioxide | 50.0 | 53.8 | 53.8 | 48.9 | 54.3 | 71.0 | 50.1 | 37.6 | 48.0 | 10.0 | 77.8 | 77.8 | 95.0 |
| Methane | 33.5 | 30.1 | 30.1 | 13.2 | 32.0 | 14.5 | 36.3 | 53.7 | 39.3 | 65.7 | 18.6 | 18.6 | 3.5 |
| Ethane | 6.0 | 5.7 | 5.7 | 6.0 | 5.7 | 4.6 | 6.0 | 4.8 | 5.8 | 11.2 | 1.5 | 1.5 | 0.2 |
| Propane | 4.0 | 4.0 | 4.0 | 7.7 | 3.6 | 3.8 | 3.5 | 1.1 | 3.1 | 6.6 | 0.4 | 0.4 | — |
| n-Butane | 3.0 | 3.2 | 3.2 | 9.9 | 2.4 | 4.0 | 2.0 | 0.3 | 1.8 | 3.9 | 0.1 | 0.1 | — |
| n-Hexane | 2.0 | 1.9 | 1.9 | 12.8 | 0.6 | 1.2 | 0.5 | — | 0.4 | 0.9 | — | — | — |
| Water | 0.1 | 0.1 | 0.1 | 0.5 | 0.1 | 0.2 | — | — | — | — | 0.1 | 0.1 | 0.1 |
| Hydrogen Sulfide | 0.5 | 0.5 | 0.5 | 0.7 | 0.5 | 0.7 | 0.5 | — | 0.4 | 0.1 | 0.6 | 0 6 | 0.9 |
| Nitrogen | 0.9 | 0.8 | 0.8 | 0.2 | 0.8 | 0.1 | 1.0 | 2.4 | 1.2 | 1.6 | 1.0 | 1.0 | 0.3 |

— = <0.1%
Membrane Area = 26 + 1,367 + 290 m$^2$
Actual Horsepower = 1,073 (step 103) + 574 (step 119) hp Example 2 (Not in Accordance With the Invention)

The computer calculation of Example 1 was repeated, but omitting membrane separation step 110. The calculation was again performed to yield a carbon dioxide product containing 95% carbon dioxide, and a methane-enriched stream containing 10% carbon dioxide.

The results of the calculation are shown in Table 2.

Comparing Table 1 with Table 2, it may be seen that both processes can recover comparable quantities of injection-grade carbon dioxide product. However, the process of Table 2 produces a methane-rich residue stream (stream 117) with a hydrocarbon dew point of 54° C., whereas in the process of Table 1, according to the invention, stream 117 has a hydrocarbon dew point of 39° C.

In a real process, this substantial difference in dew point is very beneficial. As can be seen from Table 2, stream 114 must be heated to 73° C. so as to maintain the gas above the hydrocarbon dew point in step 115. In Table 1, the stream need only be heated to 60° C. Thus, better protection for the membranes of step 115, and reduced heating costs, are provided by the process of the invention.

In addition, in a real process, the selectivity of the membranes of step 115 increases as the temperature decreases. Thus, the ability to operate the membranes of step 115 at lower temperature results in a better separation between carbon dioxide and hydrocarbons in this step.

TABLE 2

| Parameter | Stream 101 | Stream 108 | Stream 109/113 | Stream 124 | Stream 114 | Stream 117 | Stream 118 | Stream 120 | Stream 123 |
|---|---|---|---|---|---|---|---|---|---|
| Mass Flow (MMscfd) | 10.0 | 16,600 gal/day | 9.3 | 1.8 | 11.2 | 4.9 | 6.3 | 6.3 | 4.4 |
| Temperature (° C.) | 35 | 35 | 35 | −7 | 73 | 54 | 63 | 35 | 14 |
| Dew point (° C.) | | | 35 | | | 54 | | | |
| Pressure (psia) | 1,000 | 1,000 | 1,000 | 1,000 | 1,000 | 1,000 | 200 | 1,000 | 200 |
| Component (mol %) | | | | | | | | | |
| Carbon Dioxide | 50.0 | 43.4 | 50.5 | 37.4 | 48.3 | 10.0 | 78.1 | 78.1 | 95.0 |
| Methane | 33.5 | 13.7 | 35.0 | 53.2 | 38.0 | 63.7 | 18.1 | 18.1 | 3.4 |
| Ethane | 6.0 | 6.1 | 6.0 | 4.9 | 5.8 | 11.3 | 1.6 | 1.6 | 0.2 |
| Propane | 4.0 | 8.0 | 3.7 | 1.2 | 3.3 | 7.0 | 0.4 | 0.4 | — |
| n-Butane | 3.0 | 10.2 | 2.5 | 0.4 | 2.1 | 4.7 | 0.1 | 0.1 | — |
| n-Hexane | 2.0 | 17.2 | 0.9 | 0.1 | 0.7 | 1.7 | — | — | — |
| Water | 0.1 | 0.5 | 0.1 | — | — | — | 0.1 | 0.1 | 0.1 |
| Hydrogen Sulfide | 0.5 | 0.7 | 0.5 | 0.4 | 0.5 | 0.1 | 0.7 | 0.7 | 0.9 |
| Nitrogen | 0.9 | 0.2 | 0.9 | 2.3 | 1.2 | 1.5 | 0.9 | 0.9 | 0.3 |

— = <0.1%
Membrane Area = 1,453 + 309 m$^2$
Actual Horsepower = 636 hp (step 1/9 only)

Example 3

A computer calculation was performed to demonstrate the process of the invention according to the embodiment of FIG. 2. The raw gas composition and parameters were assumed to be the same as in Example 1, with the exception that the raw gas was assumed to be at 1,000 psia, so that compression step 103 was not required. It was assumed instead that a compressor was used to recompress stream 212 for remixing with stream 201.

The gas was assumed to be cooled to 30° C. in cooling step 205. Thus, gas stream 209, emerging saturated with $C_{3+}$ hydrocarbons from phase separation step 207, has a hydrocarbon dew point of 30° C.

As with Example 1, the temperature of stream 209 was assumed to be increased to 35° C. to avoid condensation of liquids as a result of cooling of the gas as it passes along the membranes 211.

Stream 213 emerges from step 210 at 25° C. and was calculated to have a dew point of 24° C. To compensate for cooling in step 214, stream 213 was assumed to be warmed to 67° C. before being passed into step 214.

The pressure on the permeate side of step 214 was assumed to be 50 psia.

The results of the calculations are shown in Table 3. Stream numbers refer to FIG. 2.

As can be seen, the process uses much less membrane area and recompression horsepower than the process of FIG. 1, and achieves an injection-grade carbon dioxide product in stream 217. However, the carbon dioxide content is lower, 88% versus 95% in Example 1.

In addition, stream 213 must be heated to 67° C. (because of the 25° C. cooling between streams 213 and 216 brought about by Joule-Thomson expansion in step 214), compared with heating to 60° C. of stream 114 in Example 1.

The carbon dioxide content of the second residue stream can be reduced to no more than about 10%, at the same time as producing a carbon dioxide product stream containing close to 90% carbon dioxide.

kept below 70° C., thus providing better protection for the membranes of step 214, improving the separation achieved in that step, and reducing heating costs.

TABLE 4

| Parameter | Stream 201 | Stream 208 | Stream 209/213 | Stream 216 | Stream 217 |
|---|---|---|---|---|---|
| Mass Flow (MMscfd) | 10.0 | 22,500 gal/day | 9.1 | 4.4 | 4.7 |
| Temperature (° C.) | 35 | 30 | 30/74 | 50 | 61 |
| Dew point (° C.) | | | 30 | 50 | |
| Pressure (psia) | 1,000 | 1,000 | 1,000 | 1,000 | 50 |
| Component (mol %) | | | | | |
| Carbon Dioxide | 50.0 | 45.3 | 50.5 | 10.0 | 88.4 |
| Methane | 33.5 | 14.4 | 35.5 | 63.6 | 9.2 |
| Ethane | 6.0 | 6.4 | 6.0 | 11.5 | 0.8 |
| Propane | 4.0 | 8.0 | 3.6 | 7.2 | 0.2 |
| n-Butane | 3.0 | 9.9 | 2.3 | 4.7 | 0.1 |
| n-Hexane | 2.0 | 14.7 | 0.7 | 1.4 | — |

TABLE 3

| Parameter | Stream 201 | Stream 202 | Stream 209 | Stream 208 | Stream 213 | Stream 212 | Stream 217 | Stream 216 |
|---|---|---|---|---|---|---|---|---|
| Mass Flow (MMscfd) | 10.0 | 12.2 | 11.0 | 29,400 gal/day | 8.8 | 2.2 | 4.5 | 4.3 |
| Temperature (° C.) | 35 | 49 | 35 | 30 | 67 | 30 | 55 | 42 |
| Dew point (° C.) | | | | 30 | 24 | | | 41 |
| Pressure (Psia) | 1,000 | 1,000 | 1,000 | 1,000 | 1,000 | 200 | 50 | 1,000 |
| Component (mol %) | | | | | | | | |
| Carbon Dioxide | 50.0 | 53.8 | 54.3 | 48.9 | 50.1 | 70.9 | 88.0 | 10.0 |
| Methane | 33.5 | 30.1 | 32.0 | 13.3 | 36.3 | 14.5 | 9.4 | 64.8 |
| Ethane | 6.0 | 5.7 | 5.7 | 6.0 | 6.0 | 4.6 | 0.8 | 11.5 |
| Propane | 4.0 | 4.0 | 3.6 | 7.7 | 3.5 | 3.8 | 0.2 | 7.0 |
| n-Butane | 3.0 | 3.2 | 2.4 | 9.9 | 2.0 | 4.0 | 0.1 | 4.1 |
| n-Hexane | 2.0 | 1.9 | 0.6 | 12.8 | 0.5 | 1.2 | — | 1.0 |
| Water | 0.1 | 0.1 | 0.1 | 0.5 | — | 0.1 | 0.1 | — |
| Hydrogen Sulfide | 0.5 | 0.5 | 0.5 | 0.7 | 0.5 | 0.7 | 0.8 | 0.1 |
| Nitrogen | 0.9 | 0.8 | 0.8 | 0.2 | 1.0 | 0.1 | 0.5 | 1.6 |

— = <0.1%
Membrane Area = 26 + 522 m$^2$
Actual Horsepower = 184 hp (to recompress stream 212)

Example 4 (Not in Accordance With the Invention)

The computer calculation of Example 3 was repeated, but omitting membrane separation step 210. The calculation was again performed to yield a carbon dioxide product containing 88% carbon dioxide, and a methane-enriched stream containing 10% carbon dioxide.

The results of the calculation are shown in Table 4.

Comparing Table 4 with Table 3, it may be seen that both processes can recover comparable quantities of injection-grade carbon dioxide product. However, the process of Table 4 produces a methane-rich residue stream (stream 216) with a hydrocarbon dew point of 50° C., whereas in the process of Table 3, according to the invention, stream 216 has a hydrocarbon dew point of 41° C.

Thus, in Table 4, stream 213 must be heated to 74° C. so as to maintain the gas above the hydrocarbon dew point in step 214.

In Table 3, the stream need only be heated to 67° C. The temperature of operation of the second membrane step is TABLE 4-continued

| Parameter | Stream 201 | Stream 208 | Stream 209/213 | Stream 216 | Stream 217 |
|---|---|---|---|---|---|
| Water | 0.1 | 0.5 | 0.1 | — | 0.1 |
| Hydrogen Sulfide | 0.5 | 0.7 | 0.5 | 0.1 | 0.8 |
| Nitrogen | 0.9 | 0.2 | 1.0 | 1.5 | 0.4 |

— = <0.1%
Membrane Area = 540 m$^2$
Actual Horsepower = 0 hp (no compression or recompression)

Example 5

The computer calculation of Example 1 was repeated assuming a 10 MMscfd, 200 psia raw feed with a lower content of carbon dioxide (23%) and containing no hydrogen sulfide or nitrogen. The feed was assumed to have the following mole percent composition:

| | |
|---|---|
| Carbon Dioxide | 23.0% |
| Methane | 65.0% |
| Ethane | 7.0% |
| Propane | 3.0% |
| n-Butane | 1.0% |
| n-Hexane | 0.9% |
| Water | 0.1% |

The gas was again assumed to be compressed to 1,000 psia and cooled to 30° C., resulting in a dew point of 30° C. for stream 109.

The pressure on the permeate side of all membrane separation steps was assumed to be 200 psia, and stream 120 was assumed to be recompressed to 1,000 psia in compression step 119.

Stream 114 was assumed to be heated to 35° C. to compensate for the reduction in temperature and increase in dew point that takes place in step 115.

The results of the calculation are shown in Table 5. Stream numbers refer to FIG. 1.

The process produces 2,400 gal/day of raw NGL (stream 108) and 1.6 MMscfd of carbon dioxide with a purity of 90%, suitable for use as injection gas.

Stream 117 has a dew point of 21° C. and contains 10% carbon dioxide. This gas could be sent for further processing.

process at 200 psia. In this case, the goal of the calculation was to reduce the carbon dioxide content of the residue stream to 2%.

The feed was assumed to have the following mole percent composition:

| | |
|---|---|
| Carbon Dioxide | 15.0% |
| Methane | 65.0% |
| Ethane | 10.0% |
| Propane | 3.0% |
| n-Butane | 2.0% |
| n-Hexane | 1.9% |
| Water | 0.1% |
| Nitrogen | 3.0% |

The gas was again assumed to be compressed to 1,000 psia and cooled to 30° C., resulting in a dew point of 30° C. for stream 109.

The pressure on the permeate side of membrane separation step 110 was assumed to be 200 psia, on the permeate side of step 115 was assumed to be 150 psia and on the permeate side of step 121 was assumed to be 100 psia. Stream 120 was assumed to be recompressed to 1,000 psia in compression step 119.

Stream 114 was assumed to be heated to 40° C. to compensate for the reduction in temperature and increase in dew point that takes place in step 115.

The results of the calculation are shown in Table 6. Stream numbers refer to FIG. 1.

TABLE 5

| Parameter | Stream 101 | Stream 102 | Stream 104 | Stream 108 | Stream 109 | Stream 112 | Stream 113 | Stream 124 | Stream 114 | Stream 117 | Stream 118 | Stream 123 |
|---|---|---|---|---|---|---|---|---|---|---|---|---|
| Mass Flow (MMscfd) | 10.0 | 12.5 | 12.5 | 2,400 gal/day | 12.4 | 2.5 | 9.9 | 1.7 | 11.6 | 8.3 | 3.3 | 1.6 |
| Temperature (° C.) | 35 | 34 | 150 | 30 | 30 | 25 | 22 | 10 | 35 | 25 | 30 | 23 |
| Dew point (° C.) | | | | | 30 | | 18 | | 14 | 21 | | |
| Pressure (psia) | 200 | 200 | 1,000 | 1,000 | 1,000 | 200 | ,000 | 1,000 | 1,000 | 1,000 | 200 | 200 |
| Component (mol %) | | | | | | | | | | | | |
| Carbon Dioxide | 23.0 | 27.3 | 27.3 | 24.9 | 27.3 | 44.8 | 23.0 | 27.5 | 23.7 | 10.0 | 57.7 | 90.0 |
| Methane | 65.0 | 59.6 | 59.6 | 21.7 | 59.9 | 37.9 | 65.4 | 67.6 | 65.7 | 76.2 | 39.5 | 9.3 |
| Ethane | 7.0 | 7.1 | 7.1 | 8.0 | 7.1 | 7.6 | 7.0 | 4.0 | 6.5 | 8.3 | 2.2 | 0.3 |
| Propane | 3.0 | 3.3 | 3.3 | 8.4 | 3.3 | 4.6 | 3.0 | 0.7 | 2.6 | 3.5 | 0.4 | — |
| n-Butane | 1.0 | 1.3 | 1.3 | 7.1 | 1.3 | 2.5 | 0.9 | 0.1 | 0.8 | 1.1 | 0.1 | — |
| n-Hexane | 0.9 | 1.1 | 1.1 | 28.2 | 1.0 | 2.1 | 0.7 | — | 0.6 | 0.8 | — | — |
| Water | 0.1 | 0.2 | 0.2 | 1.7 | 0.2 | 0.5 | 0.1 | 0.1 | 0.1 | — | 0.2 | 0.4 |

— = <0.1%

Membrane Area = 43 + 1,311 + 185 m²

Actual Horsepower = 1,133 + 304 hp

Example 6

A computer calculation was performed to demonstrate the process of the invention according to the embodiment of FIG. 1. A raw gas of flow rate 10 MMscfd, with a carbon dioxide content of 15%, was assumed to be delivered to the The process produces 14,100 gal/day of raw NGL (stream 108) and 7.8 MMscfd of treated natural gas with a carbon dioxide content of 2% (stream 117).

The process also produces 1.7 MMscfd of gas containing 75% carbon dioxide (stream 123).

TABLE 6

| Parameter | Stream 101 | Stream 102 | Stream 108 | Stream 109 | Stream 112 | Stream 113 | Stream 124 | Stream 114 | Stream 117 | Stream 118 | Stream 123 |
|---|---|---|---|---|---|---|---|---|---|---|---|
| Mass Flow (MMscfd) | 10.0 | 12.4 | 14,100 gal/day | 11.9 | 2.4 | 9.5 | 3.4 | 12.9 | 7.8 | 5.1 | 1.7 |
| Temperature (° C.) | 35 | 35 | 30 | 30 | 26 | 22 | 18 | 40 | 28 | 34 | 27 |
| Dew Point (° C.) | | | | 30 | | 17 | | 9 | 22 | | |
| Pressure (psia) | 200 | 200 | 1,000 | 1,000 | 200 | 1,000 | 1,000 | 1,000 | 1,000 | 150 | 100 |
| Component (mol %) | | | | | | | | | | | |
| Carbon Dioxide | 15.0 | 18.3 | 16.1 | 18.4 | 32.1 | 14.9 | 10.2 | 13.7 | 2.0 | 31.7 | 75.0 |
| Methane | 65.0 | 60.9 | 23.1 | 62.5 | 43.9 | 67.2 | 77.0 | 69.8 | 77.2 | 58.3 | 20.7 |
| Ethane | 10.0 | 10.4 | 11.9 | 10.3 | 12.1 | 9.9 | 6.1 | 8.9 | 11.9 | 4.3 | 0.8 |
| Propane | 3.0 | 3.3 | 8.3 | 3.1 | 4.7 | 2.7 | 0.7 | 2.2 | 3.3 | 0.5 | — |
| n-Butane | 2.0 | 2.4 | 12.1 | 2.0 | 4.2 | 1.5 | 0.2 | 1.1 | 1.8 | 0.1 | — |
| n-Hexane | 1.9 | 1.9 | 27.0 | 0.9 | 2.1 | 0.6 | — | 0.4 | 0.7 | — | — |
| Water | 0.1 | 0.1 | 1.0 | 0.1 | 0.3 | 0.1 | — | — | — | 0.1 | 0.3 |
| Nitrogen | 3.0 | 2.6 | 0.4 | 2.6 | 0.6 | 3.1 | 5.8 | 3.8 | 3.1 | 5.0 | 3.2 |

— = <0.1%
Membrane Area = 47 + 2,849 + 33 1 m$^2$
Actual Horsepower = 1,118 + 584 hp Example 7 (Not in Accordance With the Invention)

The computer calculation of Example 6 was repeated, but omitting membrane separation step 110. The calculation was again performed to yield a natural gas product stream, 117, containing 2% carbon dioxide, and a carbon dioxide stream, 123, containing 75% carbon dioxide.

The results of the calculation are shown in Table 7.

Comparing Table 6 with Table 7, it may be seen that both processes can recover comparable quantities of natural gas product that meets pipeline specification for carbon dioxide. However, the product from the process of Table 6 has a dew point of 22° C., compared with 34° C. for the product from the process of Table 7.

As can be seen from Table 7, stream 114 must be heated to 50° C. so as to maintain the gas above the hydrocarbon dew point in step 115. In Table 6, the stream need only be heated to 40° C. Thus, better protection for the membranes of step 115, and reduced heating costs, are provided by the process of the invention.

Example 8

The computer calculation of Example 6 was repeated assuming the raw feed to contain only 10% carbon dioxide, and to have the following mole percent composition:

| | |
|---|---|
| Carbon Dioxide | 10.0% |
| Methane | 70.0% |
| Ethane | 12.0% |
| Propane | 4.0% |
| n-Butane | 2.0% |
| n-Hexane | 1.9% |
| Water | 0.1% |

The results of the calculation are shown in Table 8. Stream numbers refer to FIG. 1.

As can be seen, the process produces 8.4 MMscfd of treated natural gas containing 2% carbon dioxide, with a dew point of 19° C.

Gas stream 114 must be heated to 35° C. prior to entry into membrane separation step 115 to compensate for cooling by

TABLE 7

| Parameter | Stream 101 | Stream 104 | Stream 108 | Stream 109/113 | Stream 124 | Stream 114 | Stream 117 | Stream 118 | Stream 120 | Stream 123 |
|---|---|---|---|---|---|---|---|---|---|---|
| Mass Flow (MMscfd) | 10.0 | 10.0 | 9,200 gal/day | 9.7 | 3.4 | 13.1 | 7.9 | 5.2 | 5.2 | 1.7 |
| Temperature (° C.) | 35 | 148 | 30 | 30 | 18 | 50 | 39 | 44 | 199 | 26 |
| Dew Point (° C.) | | | | 30 | | | 34 | | | |
| Pressure (psia) | 200 | 1,000 | 1,000 | 1,000 | 1,000 | 1,000 | 1,000 | 150 | 1,000 | 100 |
| Component (mol %) | | | | | | | | | | |
| Carbon Dioxide | 15.0 | 15.0 | 13.4 | 15.1 | 10.1 | 13.8 | 2.0 | 31.8 | 31.8 | 75.0 |
| Methane | 65.0 | 65.0 | 24.1 | 66.3 | 76.9 | 69.1 | 76.3 | 58.0 | 58.0 | 20.6 |
| Ethane | 10.0 | 10.0 | 11.6 | 9.9 | 6.2 | 9.0 | 11.9 | 4.4 | 4.4 | 0.8 |
| Propane | 3.0 | 3.0 | 7.8 | 2.8 | 0.7 | 2.2 | 3.5 | 0.5 | 0.5 | — |
| n-Butane | 2.0 | 2.0 | 10.8 | 1.7 | 0.2 | 1.3 | 2.1 | 0.1 | 0.1 | — |
| n-Hexane | 1.9 | 1.9 | 31.1 | 1.0 | 0.1 | 0.7 | 1.2 | 0.1 | 0.1 | — |
| Water | 0.1 | 0.1 | 0.8 | 0.1 | — | 0.1 | — | 0.2 | 0.2 | 0.4 |
| Nitrogen | 3.0 | 3.0 | 0.5 | 3.1 | 5.8 | 3.8 | 3.1 | 4.9 | 4.9 | 3.2 |

— = <0.1%
Membrane Area = 0 + 2,919 + 339 m$^2$
Actual Horsepower = 908 + 615 hp Joule-Thomson effect in this step, so that the product gas is above its dew point.

TABLE 8

| Parameter | Stream 101 | Stream 102 | Stream 104 | Stream 108 | Stream 109 | Stream 112 | Stream 113 | Stream 124 | Stream 114 | Stream 117 | Stream 118 | Stream 120 | Stream 123 |
|---|---|---|---|---|---|---|---|---|---|---|---|---|---|
| Mass Flow (MMscfd) | 10.0 | 12.4 | 12.4 | 15,300 gal/day | 11.8 | 2.4 | 9.5 | 3.3 | 12.8 | 8.4 | 4.4 | 4.4 | 1.0 |
| Temperature (° C.) | 35 | 35 | 144 | 30 | 30 | 26 | 22 | 24 | 35 | 25 | 30 | 178 | 29 |
| Dew Point (° C.) | | | | | 30 | | 17 | | 8 | 19 | | | |
| Pressure (psia) | 200 | 200 | 1,000 | 1,000 | 1,000 | 200 | 1,000 | 1,000 | 1,000 | 1,000 | 150 | 1,000 | 100 |
| Component (mol %) | | | | | | | | | | | | | |
| Carbon Dioxide | 10.0 | 12.3 | 12.3 | 10.7 | 12.4 | 22.2 | 10.0 | 12.1 | 10.5 | 2.0 | 27.0 | 27.0 | 75.0 |
| Methane | 70.0 | 66.1 | 66.1 | 25.7 | 67.9 | 49.6 | 72.5 | 79.9 | 74.4 | 78.5 | 66.5 | 66.5 | 23.5 |
| Ethane | 12.0 | 12.6 | 12.6 | 14.6 | 12.5 | 15.1 | 11.9 | 6.9 | 10.6 | 13.2 | 5.5 | 5.5 | 1.0 |
| Propane | 4.0 | 4.5 | 4.5 | 11.0 | 4.2 | 6.4 | 3.6 | 0.9 | 2.9 | 4.0 | 0.7 | 0.7 | 0.1 |
| n-Butane | 2.0 | 2.4 | 2.4 | 11.9 | 2.0 | 4.3 | 1.4 | 0.2 | 1.1 | 1.6 | 0.1 | 0.1 | — |
| n-Hexane | 1.9 | 1.9 | 1.9 | 25.2 | 0.9 | 2.1 | 0.6 | — | 0.4 | 0.7 | — | — | — |
| Water | 0.1 | 0.1 | 0.1 | 1.0 | 0.1 | 0.3 | 0.1 | — | 0.1 | — | 0.1 | 0.1 | 0.4 |

— = <0.1%
Membrane Area = 49 + 2,729 + 215 m$^2$
Actual Horsepower = 1,109 + 491 hp

We claim:

1. A process for separating carbon dioxide from a gas stream containing carbon dioxide, methane and $C_{3+}$ hydrocarbons, comprising the steps of:

(a) providing a first membrane having a first feed side and a first permeate side and being selective for $C_{3+}$ hydrocarbons over methane;

(b) passing the gas stream, under conditions in which the gas stream has a carbon dioxide partial pressure of at least about 30 psia and a $C_{3+}$ hydrocarbons combined partial pressure of at least about 30 psia, to the first membrane on the first feed side;

(c) withdrawing from the first feed side a first residue stream depleted in $C_{3+}$ hydrocarbons compared with the gas stream;

(d) withdrawing from the first permeate side a first permeate stream enriched in $C_{3+}$ hydrocarbons compared with the gas stream;

(e) providing a second membrane having a second feed side and a second permeate side and being selective for carbon dioxide over methane;

(f) passing the first residue stream to the second membrane and across the second feed side;

(g) withdrawing from the second feed side a second residue stream depleted in carbon dioxide compared with the first residue stream;

(h) withdrawing from the second permeate side a second permeate stream enriched in carbon dioxide compared with the first residue stream;

(i) providing a third membrane having a third feed side and a third permeate side and being selective for carbon dioxide over methane;

(j) passing the second permeate stream to the third membrane and across the third feed side;

(k) withdrawing from the third feed side a third residue stream depleted in carbon dioxide compared with the second permeate stream;

(l) withdrawing from the third permeate side a third permeate stream enriched in carbon dioxide compared with the second permeate stream.

2. The process of claim 1, wherein the gas stream comprises natural gas.

3. The process of claim 1, wherein the gas stream comprises gas generated as a result of miscible flood enhanced oil recovery.

4. The process of claim 1, wherein the gas stream contains at least about 8% carbon dioxide.

5. The process of claim 1, wherein the gas stream contains at least about 50% carbon dioxide.

6. The process of claim 1, wherein the gas stream further comprises water.

7. The process of claim 1, wherein the gas stream further comprises hydrogen sulfide.

8. The process of claim 1, further comprising compressing the gas stream prior to step (b).

9. The process of claim 1, further comprising compressing the gas stream to a pressure between about 500 psia and 1,500 psia prior to step (b).

10. The process of claim 1, further comprising cooling the gas stream prior to step (b).

11. The process of claim 1, further comprising cooling the gas stream by air cooling prior to step (b).

12. The process of claim 1, further comprising separating a $C_{3+}$ hydrocarbons liquid phase from the gas stream prior to step (b).

13. The process of claim 12, wherein the $C_{3+}$ hydrocarbons liquid phase is stabilized to form an NGL product.

14. The process of claim 1, further comprising separating a $C_{3+}$ hydrocarbons liquid phase and an aqueous phase from the gas stream prior to step (b).

15. The process of claim 1, wherein the gas stream is warmed before step (b).

16. The process of claim 1, further comprising recirculating at least a portion of the first permeate stream to step (b).

17. The process of claim 1, wherein the first membrane is a silicone rubber membrane.

18. The process of claim 1, wherein the carbon dioxide partial pressure is at least about 50 psia.

19. The process of claim 1, wherein the carbon dioxide partial pressure is at least about 100 psia.

20. The process of claim 1, wherein the carbon dioxide partial pressure is at least about 150 psia.

21. The process of claim 1, wherein the $C_{3+}$ hydrocarbons combined partial pressure is at least about 50 psia.

22. The process of claim 1, wherein the $C_{3+}$ hydrocarbons combined partial pressure is at least about 75 psia.

23. The process of claim 1, wherein the first residue stream has a first residue hydrocarbon dew point and the gas stream has a feed hydrocarbon dew point, and the first residue hydrocarbon dew point is at least about 5° C. lower than the feed hydrocarbon dew point.

24. The process of claim 23, wherein the first residue hydrocarbon dew point is at least about 10° C. lower than the feed hydrocarbon dew point.

25. The process of claim 1, wherein the first residue stream is passed to the second membrane at a temperature no higher than about 60° C.

26. The process of claim 1, wherein the first residue stream is passed to the second membrane at a temperature no higher than about 50° C.

27. The process of claim 1, wherein the first residue stream is passed to the second membrane at a temperature no higher than about 40° C.

28. The process of claim 1, wherein the first residue stream is warmed before step (f).

29. The process of claim 1, wherein the second membrane comprises a polymer having a repeat unit comprising a fluorinated cyclic structure.

30. The process of claim 1, wherein the second residue stream contains no more than about 10% carbon dioxide.

31. The process of claim 1, wherein the second residue stream contains no more than about 5% carbon dioxide.

32. The process of claim 1, wherein the second residue stream contains no more than about 2% carbon dioxide.

33. The process of claim 1, wherein the second residue stream is a principal product stream of the process.

34. The process of claim 1, wherein the second residue stream is passed to further treatment for additional carbon dioxide removal.

35. The process of claim 34, wherein the further treatment comprises amine scrubbing.

36. The process of claim 34, wherein the further treatment comprises membrane separation.

37. The process of claim 1, further comprising compressing the second permeate stream prior to step (j).

38. The process of claim 1, wherein the third permeate stream is a principal product stream of the process.

39. The process of claim 1, wherein the third permeate stream contains at least about 75% carbon dioxide.

40. The process of claim 1, wherein the third permeate stream contains at least about 80% carbon dioxide.

41. The process of claim 1, wherein the third permeate stream contains at least about 90% carbon dioxide.

42. The process of claim 1, further comprising recirculating at least a portion of the third residue stream for further membrane separation treatment within the process.

43. The process of claim 1, further comprising recirculating at least a portion of the third residue stream to step (f).

44. The process of claim 1, further comprising recirculating at least a portion of the third residue stream to step (b).

45. The process of claim 1, wherein at least one compression step is used in the process and wherein a fuel stream to power the compression step is provided by the process.

46. The process of claim 1, wherein the first membrane is operated at a first pressure ratio between about 3 and 30.

47. The process of claim 1, wherein the second membrane is operated at a second pressure ratio between about 3 and 30.

48. The process of claim 1, wherein the third membrane is operated at a third pressure ratio between about 3 and 30.

49. A process for separating carbon dioxide from a gas stream containing carbon dioxide, methane and $C_{3+}$ hydrocarbons, comprising the steps of:

(a) providing a first membrane having a first feed side and a first permeate side and being selective for $C_{3+}$ hydrocarbons over methane;

(b) passing the gas stream, under conditions in which the gas stream has a carbon dioxide partial pressure of at least about 200 psia and a $C_{3+}$ hydrocarbons combined partial pressure of at least about 30 psia, to the first membrane on the first feed side;

(c) withdrawing from the first feed side a first residue stream depleted in $C_{3+}$ hydrocarbons compared with the gas stream;

(d) withdrawing from the first permeate side a first permeate stream enriched in $C_{3+}$ hydrocarbons compared with the gas stream;

(e) providing a second membrane having a second feed side and a second permeate side and being selective for carbon dioxide over methane;

(f) passing the first residue stream to the second membrane and across the second feed side;

(g) withdrawing from the second feed side a second residue stream depleted in carbon dioxide compared with the first residue stream;

(h) withdrawing from the second permeate side a second permeate stream enriched in carbon dioxide compared with the first residue stream.

50. The process of claim 49, wherein the gas stream comprises gas generated as a result of miscible flood enhanced oil recovery.

51. The process of claim 49, further comprising compressing the gas stream prior to step (b).

52. The process of claim 49, further comprising compressing the gas stream to a pressure between about 500 psia and 1,500 psia prior to step (b).

53. The process of claim 49, further comprising cooling the gas stream prior to step (b).

54. The process of claim 49, further comprising cooling the gas stream by air cooling prior to step (b).

55. The process of claim 49, further comprising separating a $C_{3+}$ hydrocarbons liquid phase from the gas stream prior to step (b).

56. The process of claim 55, wherein the $C_{3+}$ hydrocarbons liquid phase is stabilized to form an NGL product.

57. The process of claim 55, further comprising separating a $C_{3+}$ hydrocarbons liquid phase and an aqueous phase from the gas stream prior to step (b).

58. The process of claim 49, wherein the gas stream is warmed before step (b).

59. The process of claim 49, further comprising recirculating at least a portion of the first permeate stream to step (b).

60. The process of claim 49, wherein the first membrane is a silicone rubber membrane.

61. The process of claim 49, wherein the first residue stream has a first residue hydrocarbon dew point and the gas stream has a feed hydrocarbon dew point, and the first residue hydrocarbon dew point is at least about 5° C. lower than the feed hydrocarbon dew point.

62. The process of claim 61, wherein the first residue hydrocarbon dew point is at least about 10° C. lower than the feed hydrocarbon dew point.

63. The process of claim 49, wherein the first residue stream is passed to the second membrane at a temperature no higher than about 70° C.

64. The process of claim 49, wherein the first residue stream is passed to the second membrane at a temperature no higher than about 60° C.

65. The process of claim 49, wherein the second membrane comprises a polymer having a repeat unit comprising a fluorinated cyclic structure.

66. The process of claim 49, wherein the second residue stream contains no more than about 10% carbon dioxide.

67. The process of claim 49, wherein the second residue stream is passed to further treatment for additional carbon dioxide removal.

68. The process of claim 67, wherein the further treatment comprises amine scrubbing.

69. The process of claim 67, where the further treatment comprises membrane separation.

70. The process of claim 49, wherein the second permeate stream contains at least about 75% carbon dioxide.

71. The process of claim 49, wherein the second permeate stream contains at least about 80% carbon dioxide.

72. The process of claim 49, wherein the second permeate stream contains at least about 90% carbon dioxide.

73. The process of claim 49, wherein at least one compression step is used in the process and wherein a fuel stream to power the compression step is provided by the process.

74. The process of claim 49, wherein the first membrane is operated at a first pressure ratio between about 3 and 30.

75. The process of claim 49, wherein the second membrane is operated at a second pressure ratio between about 3 and 30.

76. A process for separating carbon dioxide from a gas stream containing carbon dioxide, methane and $C_{3+}$ hydrocarbons, comprising the steps of:

(a) compressing the gas stream;

(b) cooling the gas stream, thereby inducing condensation of a portion of $C_{3+}$ hydrocarbons;

(c) separating the gas stream into a $C_{3+}$ hydrocarbon liquid phase and an uncondensed gas stream;

(d) providing a first membrane having a first feed side and a first permeate side and being selective for $C_{3+}$ hydrocarbons over methane;

(e) passing the uncondensed gas stream, under conditions in which the uncondensed gas stream has a carbon dioxide partial pressure of at least about 30 psia and a $C_{3+}$ hydrocarbons combined partial pressure of at least about 30 psia, to the first membrane on the first feed side;

(f) withdrawing from the first feed side a first residue stream depleted in $C_{3+}$ hydrocarbons compared with the uncondensed gas stream;

(g) withdrawing from the first permeate side a first permeate stream enriched in $C_{3+}$ hydrocarbons compared with the uncondensed gas stream;

(h) providing a second membrane having a second feed side and a second permeate side and being selective for carbon dioxide over methane;

(i) passing the first residue stream to the second membrane and across the second feed side;

(j) withdrawing from the second feed side a second residue stream depleted in carbon dioxide compared with the first residue stream;

(k) withdrawing from the second permeate side a second permeate stream enriched in carbon dioxide compared with the first residue stream;

(l) providing a third membrane having a third feed side and a third permeate side and being selective for carbon dioxide over methane;

(m) passing the second permeate stream to the third membrane and across the third feed side;

(n) withdrawing from the third feed side a third residue stream depleted in carbon dioxide compared with the second permeate stream;

(o) withdrawing from the third permeate side a third permeate stream enriched in carbon dioxide compared with the second permeate stream.

77. The process of claim 76, further comprising recirculating at least a portion of the first permeate stream to step (a).

78. The process of claim 76, further comprising recirculating at least a portion of the third residue stream to step (i).

79. A process for separating carbon dioxide from a gas stream containing carbon dioxide, methane and $C_{3+}$ hydrocarbons, comprising the steps of:

(a) compressing the gas stream;

(b) cooling the gas stream, thereby inducing condensation of a portion of $C_{3+}$ hydrocarbons;

(c) separating the gas stream into a $C_{3+}$ hydrocarbon liquid phase and an uncondensed gas stream;

(d) providing a first membrane having a first feed side and a first permeate side and being selective for $C_{3+}$ hydrocarbons over methane;

(e) passing the uncondensed gas stream, under conditions in which the uncondensed gas stream has a carbon dioxide partial pressure of at least about 200 psia and a $C_{3+}$ hydrocarbons combined partial pressure of at least about 30 psia, to the first membrane on the first feed side;

(f) withdrawing from the first feed side a first residue stream depleted in $C_{3+}$ hydrocarbons compared with the uncondensed gas stream;

(g) withdrawing from the first permeate side a first permeate stream enriched in $C_{3+}$ hydrocarbons compared with the uncondensed gas stream;

(h) providing a second membrane having a second feed side and a second permeate side and being selective for carbon dioxide over methane;

(i) passing the first residue stream to the second membrane and across the second feed side;

(j) withdrawing from the second feed side a second residue stream depleted in carbon dioxide compared with the first residue stream;

(k) withdrawing from the second permeate side a second permeate stream enriched in carbon dioxide compared with the first residue stream.

80. The process of claim 79, further comprising recirculating at least a portion of the first permeate stream to step (a).

81. Apparatus for separating carbon dioxide from a gas stream containing carbon dioxide, methane and $C_{3+}$ hydrocarbons, comprising:

(a) a first compressor having a compressor inlet line and a compressor outlet line;

(b) cooling means positioned in the compressor outlet line for cooling compressed gas passing through the compressor outlet line;

(c) a phase separator positioned in the compressor outlet line such that condensed liquids can be removed from compressed, cooled gas;

(d) a first membrane separation unit containing a first membrane selective for $C_{3+}$ hydrocarbons over methane, and having a first feed side and a first permeate side, the first membrane separation unit being connected to the phase separator such that gas can flow from the phase separator to and across the first feed side of the first membrane;

(e) a recirculation line connecting the first permeate side and the compressor inlet line;

(f) a second membrane separation unit containing a second membrane selective for carbon dioxide over methane, and having a second feed side and a second permeate side, the second membrane separation unit being connected to the first membrane separation unit such that gas can flow from the first feed side to and across the second feed side;

(g) a third membrane separation unit containing a third membrane selective for carbon dioxide over methane, and having a third feed side and a third permeate side, the third membrane separation unit being connected to the second membrane separation unit such that gas can flow from the second permeate side to and across the third feed side, and from the third feed side to and across the second feed side;

(h) a second compressor connected between the second and third membrane separation units such that gas leaving the second permeate side can be compressed before flowing to the third feed side.

82. The apparatus of claim 81, wherein the first membrane is a silicone rubber membrane.

83. The apparatus of claim 81, further comprising a warming means positioned between the first and second membrane separation units for warming gas flowing from the first feed side to the second feed side.

84. The apparatus of claim 81, wherein the second membrane comprises a polymer having a repeat unit comprising a fluorinated cyclic structure.

* * * * *